(12) United States Patent
Liu et al.

(10) Patent No.: US 10,484,954 B2
(45) Date of Patent: Nov. 19, 2019

(54) SYNCHRONIZATION FOR WIDEBAND COVERAGE ENHANCEMENT

(71) Applicant: QUALCOMM Incorporated, San Diego, CA (US)

(72) Inventors: Chih-Hao Liu, San Diego, CA (US); Srinivas Yerramalli, San Diego, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/855,442

(22) Filed: Dec. 27, 2017

(65) Prior Publication Data
US 2018/0332551 A1  Nov. 15, 2018

Related U.S. Application Data

(60) Provisional application No. 62/504,394, filed on May 10, 2017.

(51) Int. Cl.
*H04W 56/00* (2009.01)

(52) U.S. Cl.
CPC ..... *H04W 56/0005* (2013.01); *H04W 56/001* (2013.01); *H04W 56/0025* (2013.01)

(58) Field of Classification Search
CPC ............... H04W 56/00; H04W 56/001; H04W 56/0005; H04W 56/0025; H04W 56/002; H04W 74/0891; H04B 1/7073; H04B 1/7087; H04B 1/7156; H04B 1/7183; H04B 7/2048; H04B 7/2125; H04B 7/2662;

(Continued)

(56) References Cited

U.S. PATENT DOCUMENTS 9,148,862 B2 * 9/2015 Devarasetty ...... H04W 56/0015
9,485,069 B2 * 11/2016 Wang .................... H04L 5/0053
(Continued)

FOREIGN PATENT DOCUMENTS

| WO | 2011130630 A1 | 10/2011 |
| WO | 2017027822 A1 | 2/2017 |
| WO | 2017035238 A2 | 3/2017 |

OTHER PUBLICATIONS

International Search Report and Written Opinion—PCT/US2018/027558—ISA/EPO—dated Jul. 3, 2018.

*Primary Examiner* — Tri H Phan
(74) *Attorney, Agent, or Firm* — Liem T. Do

(57) ABSTRACT

Methods, systems, and devices for wireless communication are described for synchronization for wideband coverage enhancement. A user equipment (UE) may receive a primary synchronization signal (PSS) and a secondary synchronization signal (SSS) in a subframe. In one example, the SSS may be received in a symbol that is after a symbol in which the PSS is received, and after a set of symbols in which a set of other synchronization signals is received. In another example, the PSS may be received in each of a first plurality of consecutive symbols, and the SSS may be received in each of a second plurality of consecutive symbols, wherein the second plurality of consecutive symbols is after the first plurality of consecutive symbols within the subframe. The UE may synchronize with a base station based at least in part on the PSS and the SSS. Numerous other aspects are provided.

30 Claims, 24 Drawing Sheets

(58) Field of Classification Search
CPC .. H04B 7/2665; H04B 7/2668; H04B 7/2671;
H04B 7/2675; H04B 7/2678; H04B 7/2681; H04B 7/2684; H04B 7/2687; H04B 7/269; H04B 7/2693; H04B 7/2696
See application file for complete search history.

(56) References Cited

U.S. PATENT DOCUMENTS

| | | | |
|---|---|---|---|
| 9,591,644 B2* | 3/2017 | Chen | H04W 48/12 |
| 10,237,837 B2* | 3/2019 | Seo | H04W 56/00 |
| 10,263,825 B2* | 4/2019 | Seo | H04W 56/002 |
| 2014/0211670 A1 | 7/2014 | Alex et al. | |
| 2017/0188319 A1* | 6/2017 | Seo | H04W 56/00 |
| 2017/0223648 A1* | 8/2017 | Shin | H04W 56/005 |
| 2018/0192355 A1* | 7/2018 | Kim | H04J 11/00 |
| 2018/0310267 A1* | 10/2018 | Liu | H04W 56/001 |
| 2019/0037609 A1* | 1/2019 | Harada | H04W 72/02 |

\* cited by examiner 605-a

| Index $k$ | $(\mu_k, \eta_k)$ | | Index $k$ | $(\mu_k, \eta_k)$ | |
|---|---|---|---|---|---|
| | Root $\mu_k$ | Cyclic Shift $\eta_k$ | | Root $\mu_k$ | Cyclic Shift $\eta_k$ |
| 0 | R1 | $C_{11}$ | 8 | R3 | $C_{31}$ |
| 1 | R1 | $C_{12}$ | 9 | R3 | $C_{32}$ |
| 2 | R1 | $C_{13}$ | 10 | R3 | $C_{33}$ |
| 3 | R1 | $C_{14}$ | 11 | R3 | $C_{34}$ |
| 4 | R2 | $C_{21}$ | 12 | R4 | $C_{41}$ |
| 5 | R2 | $C_{22}$ | 13 | R4 | $C_{42}$ |
| 6 | R2 | $C_{23}$ | 14 | R4 | $C_{43}$ |
| 7 | R2 | $C_{24}$ | 15 | R4 | $C_{44}$ |

600-a 605-b

| Index $k$ | $(\mu_k, \eta_k)$ | | Index $k$ | $(\mu_k, \eta_k)$ | |
|---|---|---|---|---|---|
| | Root $\mu_k$ | Cyclic Shift $\eta_k$ | | Root $\mu_k$ | Cyclic Shift $\eta_k$ |
| 0 | 9 | 0 | 8 | 13 | 4 |
| 1 | 9 | 16 | 9 | 13 | 20 |
| 2 | 9 | 32 | 10 | 13 | 36 |
| 3 | 9 | 48 | 11 | 13 | 52 |
| 4 | 54 | 8 | 12 | 50 | 4 |
| 5 | 54 | 24 | 13 | 50 | 20 |
| 6 | 54 | 40 | 14 | 50 | 36 |
| 7 | 54 | 56 | 15 | 50 | 52 |

SYNCHRONIZATION FOR WIDEBAND COVERAGE ENHANCEMENT

CROSS REFERENCE TO RELATED APPLICATION UNDER 35 U.S.C. § 119

This application claims priority to U.S. Provisional Patent Application No. 62/504,394 filed on May 10, 2017 entitled "SYNCHRONIZATION FOR WIDEBAND COVERAGE ENHANCEMENT," which is incorporated by reference herein.

BACKGROUND

The following relates generally to wireless communication, and more specifically to synchronization for wideband coverage enhancement.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

At times, a UE may need to perform an initial access (or initial acquisition) procedure to gain access to a wireless network. As part of the initial access procedure, the UE may need to search for a synchronization channel transmitted by a network access device, such as a base station, of the wireless network. The UE also may acquire various items of system information, such as information contained in a master information block (MIB) or one or more system information blocks (e.g., SIB1, SIB2, etc.) that may be transmitted in a physical broadcast channel (PBCH) transmission from a base station.

SUMMARY

The described techniques relate to improved methods, systems, devices, or apparatuses that support synchronization for wideband coverage enhancement. Generally, the described techniques provide for reducing the duration of cell acquisition by a user equipment (UE). Conventional cell acquisition techniques are not conducive to operating in systems using listen before talk (LBT) procedures, are unable to coherently combine more than two symbols due to frequency mismatch between the UE and base station, do not effectively combine symbols to reduce noise, and combinations thereof. The examples described herein may provide a primary synchronization signal (PSS) detection technique that improves a probability of one-shot detection. Moreover, the techniques described herein may encode a cell identifier group, subframe offset for a reference signal, or both, in a secondary synchronization signal (SSS) sequence that may be used for determining subframe timing and a scrambling rule for the reference signal.

A method of wireless communication is described. The method may include receiving, by a UE, a primary synchronization signal PSS and a SSS in subframe of a frame, wherein the SSS is received in a symbol of the subframe that is after a symbol of the subframe in which the PSS is received, and after a set of symbols of the subframe in which a set of other synchronization signals is received; and synchronizing, by the UE, with a base station based at least in part on the PSS and the SSS received in the subframe.

An apparatus for wireless communication is described. The apparatus may include means for receiving a primary synchronization signal PSS and a SSS in subframe of a frame, wherein the SSS is received in a symbol of the subframe that is after a symbol of the subframe in which the PSS is received, and after a set of symbols of the subframe in which a set of other synchronization signals is received; and means for synchronizing the apparatus with a base station based at least in part on the PSS and the SSS received in the subframe.

Another apparatus for wireless communication is described. The apparatus may include a processor, memory in electronic communication with the processor, and instructions stored in the memory. The instructions may be operable to cause the processor to receive a primary synchronization signal PSS and a SSS in subframe of a frame, wherein the SSS is received in a symbol of the subframe that is after a symbol of the subframe in which the PSS is received, and after a set of symbols of the subframe in which a set of other synchronization signals is received; and synchronize the apparatus with a base station based at least in part on the PSS and the SSS received in the subframe.

A non-transitory computer readable medium for wireless communication is described. The non-transitory computer-readable medium may include instructions operable to cause a processor to receive a primary synchronization signal PSS and a SSS in subframe of a frame, wherein the SSS is received in a symbol of the subframe that is after a symbol of the subframe in which the PSS is received, and after a set of symbols of the subframe in which a set of other synchronization signals is received; and synchronize a UE with a base station based at least in part on the PSS and the SSS received in the subframe.

Some examples of the method, apparatus, and non-transitory computer-readable medium described above may further include processes, features, means, or instructions for receiving the PSS and the SSS in another subframe of the frame, wherein the SSS is received in a symbol of the other subframe that is before a symbol of the other subframe in which the PSS is received, and before a set of symbols of the other subframe in which the set of other synchronization signals is received, wherein the other subframe is before the subframe, and wherein a UE is configured to synchronize with a base station based at least in part on the PSS or the SSS received in the other subframe.

In some examples of the method, apparatus, and non-transitory computer-readable medium described above, within the subframe: the symbols in which the PSS and the SSS are received are at a first particular location, and the set of symbols in which the set of other synchronization signals is received is at a second particular location; and within the other subframe: the set of symbols in which the set of other synchronization signals is received is at the first particular location, and the symbols in which the PSS the SSS are received are at the second particular location.

In some examples of the method, apparatus, and non-transitory computer-readable medium described above, within the subframe: another PSS, included in the set of other synchronization signals, is received in a symbol, at the second particular location, that is before a symbol in which another SSS, included in the set of other synchronization signals, is received; and within the other subframe: the other PSS, included in the set of other synchronization signals, is received in a symbol, at the first particular location, that is after a symbol in which the other SSS, included in the set of other synchronization signals, is received.

Some examples of the method, apparatus, and non-transitory computer-readable medium described above may further include processes, features, means, or instructions for receiving the PSS and the SSS in another subframe of the frame, wherein the SSS is received in a symbol of the other subframe that is after a symbol of the other subframe in which the PSS is received, and after a set of symbols of the other subframe in which the set of other synchronization signals is receive, wherein the other subframe is after the subframe, and wherein the UE is configured to synchronize with the base station based at least in part on the PSS or the SSS received in the other subframe.

A method of wireless communication is described. The method may include receiving, by a UE, a PSS and a SSS in subframe of a frame, wherein the PSS is received in each of a first plurality of consecutive symbols of the subframe, and wherein the SSS is received in each of a second plurality of consecutive symbols of the subframe, wherein the second plurality of consecutive symbols is after the first plurality of consecutive symbols within the subframe; and synchronizing, by the UE, with a base station based at least in part on the PSS and the SSS received in the subframe.

An apparatus for wireless communication is described. The apparatus may include means for receiving a PSS and a SSS in subframe of a frame, wherein the PSS is received in each of a first plurality of consecutive symbols of the subframe, and wherein the SSS is received in each of a second plurality of consecutive symbols of the subframe, wherein the second plurality of consecutive symbols is after the first plurality of consecutive symbols within the subframe; and means for synchronizing the apparatus with a base station based at least in part on the PSS and the SSS received in the subframe.

Another apparatus for wireless communication is described. The apparatus may include a processor, memory in electronic communication with the processor, and instructions stored in the memory. The instructions may be operable to cause the processor to receive a PSS and a SSS in subframe of a frame, wherein the PSS is received in each of a first plurality of consecutive symbols of the subframe, and wherein the SSS is received in each of a second plurality of consecutive symbols of the subframe, wherein the second plurality of consecutive symbols is after the first plurality of consecutive symbols within the subframe; and synchronize the apparatus with a base station based at least in part on the PSS and the SSS received in the subframe.

A non-transitory computer readable medium for wireless communication is described. The non-transitory computer-readable medium may include instructions operable to cause a processor to receive a PSS and a SSS in subframe of a frame, wherein the PSS is received in each of a first plurality of consecutive symbols of the subframe, and wherein the SSS is received in each of a second plurality of consecutive symbols of the subframe, wherein the second plurality of consecutive symbols is after the first plurality of consecutive symbols within the subframe; and synchronize a UE with a base station based at least in part on the PSS and the SSS received in the subframe.

In some examples of the method, apparatus, and non-transitory computer-readable medium described above, the first plurality of consecutive symbols includes fourteen or fewer consecutive symbols of the subframe.

In some examples of the method, apparatus, and non-transitory computer-readable medium described above, the second plurality of consecutive symbols includes fourteen or fewer consecutive symbols of the subframe.

Some examples of the method, apparatus, and non-transitory computer-readable medium described above may further include processes, features, means, or instructions for determining a physical cell identity, associated with the base station, based at least in part on the SSS and a set of hypotheses associated with the PSS, wherein the UE is configured to synchronize with the base station based at least in part on the physical cell identity.

Some examples of the method, apparatus, and non-transitory computer-readable medium described above may further include processes, features, means, or instructions for combining the PSS, received in one of the first plurality of consecutive symbols of the subframe, with another PSS received in another symbol, wherein the UE is configured to synchronize with the base station based at least in part on combining the PSS and the other PSS.

In some examples of the method, apparatus, and non-transitory computer-readable medium described above, a cover code sequence, associated with the PSS, is a binary cover code.

In some examples of the method, apparatus, and non-transitory computer-readable medium described above, the SSS is associated with a cell identifier group, associated with the base station, and a subframe offset associated with a reference signal.

A method of wireless communication is described. The method may include generating, by a base station, a SSS based at least in part on a cell identifier group associated with the base station; and transmitting, by the base station, the SSS and a PSS in a subframe of a frame, wherein the SSS is transmitted in a symbol of the subframe that is after a symbol of the subframe in which the PSS is transmitted, and after a set of symbols of the subframe in which a set of other synchronization signals is transmitted.

An apparatus for wireless communication is described. The apparatus may include means for generating a SSS based at least in part on a cell identifier group associated with a base station; and means for transmitting the SSS and a PSS in a subframe of a frame, wherein the SSS is transmitted in a symbol of the subframe that is after a symbol of the subframe in which the PSS is transmitted, and after a set of symbols of the subframe in which a set of other synchronization signals is transmitted.

Another apparatus for wireless communication is described. The apparatus may include a processor, memory in electronic communication with the processor, and instructions stored in the memory. The instructions may be operable to cause the processor to generate a SSS based at least in part on a cell identifier group associated with a base station; and transmit the SSS and a PSS in a subframe of a frame, wherein the SSS is transmitted in a symbol of the subframe that is after a symbol of the subframe in which the PSS is transmitted, and after a set of symbols of the subframe in which a set of other synchronization signals is transmitted.

A non-transitory computer readable medium for wireless communication is described. The non-transitory computer-readable medium may include instructions operable to cause a processor to generate a SSS based at least in part on a cell identifier group associated with a base station; and transmit the SSS and a PSS in a subframe of a frame, wherein the SSS is transmitted in a symbol of the subframe that is after a symbol of the subframe in which the PSS is transmitted, and after a set of symbols of the subframe in which a set of other synchronization signals is transmitted.

Some examples of the method, apparatus, and non-transitory computer-readable medium described above may further include processes, features, means, or instructions for transmitting the PSS and the SSS in another subframe of the frame, wherein the SSS is transmitted in a symbol of the other subframe that is before a symbol of the other subframe in which the PSS is transmitted, and before a set of symbols of the other subframe in which the set of other synchronization signals is transmitted, wherein the other subframe is before the subframe, and wherein a user equipment is configured to synchronize with the base station based at least in part on the PSS or the SSS transmitted in the other subframe.

In some examples of the method, apparatus, and non-transitory computer-readable medium described above, within the subframe: the symbols in which the PSS and the SSS are transmitted are at a first particular location, and the set of symbols in which the set of other synchronization signals is transmitted is at a second particular location; and within the other subframe: the set of symbols in which the set of other synchronization signals is transmitted is at the first particular location, and the symbols in which the PSS the SSS are transmitted are at the second particular location.

In some examples of the method, apparatus, and non-transitory computer-readable medium described above, within the subframe: another PSS, included in the set of other synchronization signals, is transmitted in a symbol, at the second particular location, that is before a symbol in which another SSS, included in the set of other synchronization signals, is transmitted; and within the other subframe: the other PSS, included in the set of other synchronization signals, is transmitted in a symbol, at the first particular location, that is after a symbol in which the other SSS, included in the set of other synchronization signals, is transmitted.

Some examples of the method, apparatus, and non-transitory computer-readable medium described above may further include processes, features, means, or instructions for transmitting the PSS and the SSS in another subframe of the frame, wherein the SSS is transmitted in a symbol of the other subframe that is after a symbol of the other subframe in which the PSS is transmitted, and after a set of symbols of the other subframe in which the set of other synchronization signals is transmitted, wherein the other subframe is after the subframe, and wherein a user equipment is configured to synchronize with the base station based at least in part on the PSS or the SSS transmitted in the other subframe.

A method of wireless communication is described. The method may include generating, by a base station, a SSS based at least in part on a cell identifier group associated with the base station; and transmitting, by the base station, the SSS and a PSS in a subframe of a frame, wherein the PSS is transmitted in each of a first plurality of consecutive symbols of the subframe, and wherein the SSS is transmitted in each of a second plurality of consecutive symbols of the subframe, wherein the second plurality of consecutive symbols is after the first plurality of consecutive symbols within the subframe.

An apparatus for wireless communication is described. The apparatus may include means for generating a SSS based at least in part on a cell identifier group associated with the base station; and means for transmitting the SSS and a PSS in a subframe of a frame, wherein the PSS is transmitted in each of a first plurality of consecutive symbols of the subframe, and wherein the SSS is transmitted in each of a second plurality of consecutive symbols of the subframe, wherein the second plurality of consecutive symbols is after the first plurality of consecutive symbols within the subframe.

Another apparatus for wireless communication is described. The apparatus may include a processor, memory in electronic communication with the processor, and instructions stored in the memory. The instructions may be operable to cause the processor to generate a SSS based at least in part on a cell identifier group associated with the base station; and transmit the SSS and a PSS in a subframe of a frame, wherein the PSS is transmitted in each of a first plurality of consecutive symbols of the subframe, and wherein the SSS is transmitted in each of a second plurality of consecutive symbols of the subframe, wherein the second plurality of consecutive symbols is after the first plurality of consecutive symbols within the subframe.

A non-transitory computer readable medium for wireless communication is described. The non-transitory computer-readable medium may include instructions operable to cause a processor to generate a SSS based at least in part on a cell identifier group associated with the base station; and transmit the SSS and a PSS in a subframe of a frame, wherein the PSS is transmitted in each of a first plurality of consecutive symbols of the subframe, and wherein the SSS is transmitted in each of a second plurality of consecutive symbols of the subframe, wherein the second plurality of consecutive symbols is after the first plurality of consecutive symbols within the subframe.

In some examples of the method, apparatus, and non-transitory computer-readable medium described above, the first plurality of consecutive symbols includes fourteen or fewer consecutive symbols of the subframe.

In some examples of the method, apparatus, and non-transitory computer-readable medium described above, the second plurality of consecutive symbols includes fourteen or fewer consecutive symbols of the subframe.

In some examples of the method, apparatus, and non-transitory computer-readable medium described above, a cover code sequence, associated with the PSS, is a binary cover code.

In some examples of the method, apparatus, and non-transitory computer-readable medium described above, the SSS is associated with a cell identifier group, associated with the base station, and a subframe offset associated with a reference signal.

BRIEF DESCRIPTION OF THE DRAWINGS

FIG. 6 illustrates an example of tables that support synchronization for wideband coverage enhancement in accordance with aspects of the present disclosure.

DETAILED DESCRIPTION

Figure 1:
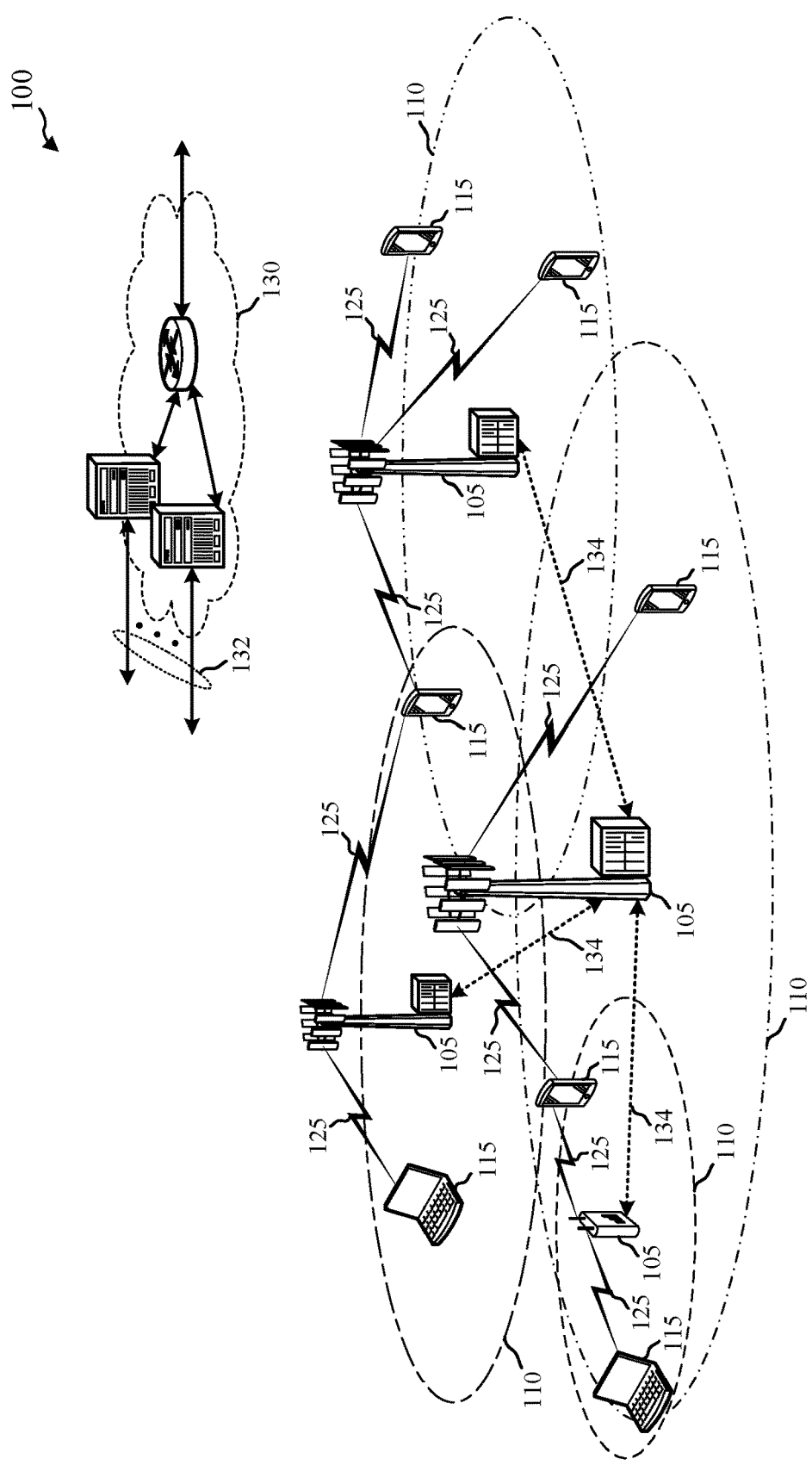
FIG. 1 illustrates an example of a system for wireless communication that supports synchronization for wideband coverage enhancement in accordance with aspects of the present disclosure.

Wireless communications systems as described herein may be configured to configure and transmit synchronization signals within subframes of a frame to aid a user equipment (UE) in initial acquisition and communication with a base station. In some examples, the UE may process the synchronization signals (e.g., primary synchronization signal (PSS) and secondary synchronization signal (SSS)) to obtain symbol timing and subframe timing of a base station for acquiring reference signal transmissions for decoding of a channel.

Detecting of PSS timing and initial frequency offset correction are bottlenecks that lengthen the amount of time for a UE to perform initial acquisition. In conventional solutions, a base station may transmit subframes transporting PSS and SSS within discovery reference signal (DRS) measurement timing configuration (DMTC) windows that occur periodically (e.g., every 80, 160, or 320 milliseconds). Typically, PSS and SSS are transmitted only once within a DMTC periodicity, and the PSS/SSS is found only within the first 32 milliseconds (e.g., 5 bits of subframe information) of the DMTC window.

Conventional solutions for detecting PSS timing may not adequately meet SNR dB specifications for achieving one-shot detection probabilities. A one-shot detection probability is the probability of detecting PSS and SSS in a single DMTC window. For example, MuLTEfire (MF) systems may specify detection of a two symbol PSS at an SNR=−4.5 dB. As another example, MF systems may specify a particular one shot detection probability (e.g., 50%) at SNR=−10.5 dB. Some systems may specify detection at even lower SNRs. In some cases, at least 12 symbols of PSS may be combined to achieve detection at low SNRs. Conventional solutions, however, use only two PSS symbols per subframe, and hence a UE may have to monitor 12 symbols spread across 6 different subframes to achieve the desired one shot PSS/SSS detection probability. In MF systems, two PSS symbols and two SSS symbols may be transported within a single DMTC window, but combining PSS and SSS symbols across multiple DMTC windows can be challenging due to floating timing between the windows. Moreover, utilizing multiple subframes to detect PSS and SSS is not well-suited to systems operating in listen-before-talk (LBT) environments. Additional buffer hardware may be used to enable the received PSS symbols during PSS detection.

Further complicating PSS timing detection is that conventional techniques for performing PSS detection do not adequately account for frequency discrepancies between the UE and the base station, nor adequately reduce noise. In conventional techniques for performing PSS detection, a UE may receive a signal and partition 12 symbols with timing hypotheses $\tau$ into 12 column vectors $R(\tau)=[r_0, r_1, \ldots, r_{11}]$. The UE may perform cross-correlation with PSS symbol p and cover code $s_m$ for each symbol to generate cross-correlation symbols: $y(\tau)=[y_0, y_1, \ldots, y_{11}]=p^H \cdot [s_0 r_0, s_1 r_1, \ldots, s_{11} r_{11}]$. The UE may perform PSS coherently combining of C symbols to using the following equations.

$$\bar{y}(\tau) = [\bar{y}_0, \bar{y}_1, \ldots, \bar{y}_{N-1}], \bar{y}_m = \frac{1}{C}\sum_c y_{C \cdot m+c}.$$

The UE may then compute a cost function by non-coherent combining the cross-correlation symbols using the following equation:

$$\rho(\tau) = \frac{1}{N}\sum_m |\bar{y}_m|^2.$$

The UE may detect the PSS using the following equation:

$$\max_\tau \left\{ \frac{|\rho(\tau)|}{|\bar{\rho}|} \right\} <> \text{threshold}.$$

The UE may retain top N hypotheses of T and frequency bin for validation during SSS detection.

Because the UE and the base station may operate at slightly different frequencies, the UE is unable to determine a frequency offset limit to account for the frequency discrepancy. Uncertainty in the frequency offset limit disadvantageously limits the number of symbols that the UE can coherently combine to two symbols (e.g., max frequency offset is 5 KHz and coherence time is 90 microseconds). Moreover, non-coherent combining only provides gain from fading diversity but does not reduce noise.

Even after PSS and SSS have been detected, a UE then has to determine the location of one or more reference signals in one or more subframes. In some cases, a DRS transmission for the UE may span a full transmission opportunity (e.g., around 6-7 subframes including one subframe for legacy DRS). The UE may process the reference signals to determine how to decode a physical broadcast channel (PBCH) of the frame. The PBCH may include information that the UE may use for cell acquisition, such as a master information block (MIB) and a system information block (SIB).

In many instances, the base station scrambles the reference signal and transmits the scrambled reference signal within one or more subframes. The UE has to determine a scrambling rule to use to descramble the reference signal in order to decode the PBCH. A subframe number indication may indicate which scrambling rule to use. In joint signaling, the UE may process the SSS to determine the subframe number indication which indicates the location of a PBCH (e.g., 5 bits indicating PBCH location) within the DMTC window. The scrambling rules may be associated with the PBCH location, and the UE may select the scrambling rule based on the determined PBCH location. In independent signaling, the PBCH may include the subframe number indication that indicates which scrambling rule to apply, and the UE may have to follow a set of descrambling rules to derive the subframe number indication.

The examples described herein may provide for an improved rate of one-shot PSS and SSS detection. For example, a base station may transmit a PSS sequence and a SSS sequence, each in a single symbol period of a given subframe, and may transmit the same PSS sequence and the same SSS sequence in respective single symbols of other subframes. In this example, in a first subframe, the base station may transmit the PSS sequence after the SSS sequence and before a set of sequences corresponding to a set of other synchronization signals (e.g., a legacy PSS, a legacy SSS). In other subframes (e.g., subframes after the first subframe), the base station may transmit the PSS sequence after the set of sequences corresponding to the set of other synchronization signals and before the SSS sequence. Transmitting the PSS sequence and the SSS sequence in this manner provides improved one-shot detection probability by a UE within a single DMTC window without negatively impacting synchronization of legacy UEs (e.g., UEs that synchronize based on the legacy PSS and the SSS transmitted in the DMTC window).

As another example, the base station may transmit a same PSS sequence in multiple consecutive symbol periods within a single subframe (e.g., a set of 6 consecutive symbol periods in the subframe) and may transmit a same SSS sequence in multiple consecutive symbol periods within the single subframe (e.g., a set of 6 consecutive symbol periods the subframe). In other words, the base station may repetitively transmit both the PSS sequence and the SSS sequence within a single subframe. Transmitting the PSS sequence and the SSS sequence in this manner provides improved one-shot detection probability by a UE within a single DMTC window. Furthermore, having all of the PSS symbols in a single subframe beneficially saves buffer hardware and permits a UE to perform correlation computations for multiple timing hypotheses within a single DMTC window. Moreover, the techniques described herein may encode a cell identifier group, subframe offset for a reference signal, or both, in the SSS sequence that may be used for determining subframe timing and a scrambling rule for the reference signal. The techniques described herein beneficially reduce the duration of cell acquisition by the UE and provide an improved rate of one-shot PSS and SSS detection.

Aspects of the disclosure are initially described in the context of a wireless communications system. The wireless communications system may provide for enhanced PSS and SSS detection to reduce the duration of cell acquisition. Aspects of the disclosure are further illustrated by and described with reference to apparatus diagrams, system diagrams, and flowcharts that relate to synchronization for wideband coverage enhancement.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE), LTE-Advanced (LTE-A) network, or a New Radio (NR) network. In some cases, wireless communications system 100 may support enhanced broadband communications, ultra-reliable (i.e., mission critical) communications, low latency communications, and communications with low-cost and low-complexity devices. In some aspects, the base station 105-a may transmit a PSS sequence and a SSS sequence, each in a single symbol period of a given subframe, and may transmit the same PSS sequence and the same SSS sequence in other subframes, as described herein. In some aspects, the base station 105-1 may transmit a PSS sequence and a SSS sequence within consecutive symbol periods of a subframe of a frame to reduce the duration of cell acquisition and/or to improve a probability of one-shot PSS and SSS detection.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, and/or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, and/or the like. Base stations 105 may also be referred to as evolved NodeBs (eNBs) 105.

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

The core network 130 may provide user authentication, access authorization, tracking, Internet Protocol (IP) connectivity, and other access, routing, or mobility functions. At least some of the network devices, such as base station 105 may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate in an ultra-high frequency (UHF) frequency region using frequency bands from 700 MHz to 2600 MHz (2.6 GHz), although some networks (e.g., a wireless local area network (WLAN)) may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communications system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g., a base station 105) and a receiver (e.g., a UE 115), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer to improve link efficiency. In the control plane, the Radio Resource Control (RRC) protocol layer may provide establishment, configuration, and maintenance of an RRC connection between a UE 115 and a network device, base station 105, or core network 130 supporting radio bearers for user plane data. At the Physical (PHY) layer, transport channels may be mapped to physical channels.

Time intervals in LTE or NR may be expressed in multiples of a basic time unit (which may be a sampling period of $T_s$=1/30,720,000 seconds). Time resources may be organized according to radio frames of length of 10 ms ($T_f$=307200 $T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected component carriers using short TTIs).

A resource element may consist of one symbol period and one subcarrier (e.g., a 15 KHz frequency range). A resource block may contain 12 consecutive subcarriers in the frequency domain and, for a normal cyclic prefix in each OFDM symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In some cases, wireless communications system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable.

A shared radio frequency spectrum band may be utilized in an NR shared spectrum system. For example, an NR shared spectrum may utilize any combination of licensed, shared, and unlicensed spectrums, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, wireless communications system 100 may utilize both licensed and unlicensed radio frequency spectrum bands. For example, wireless communications system 100 may employ LTE License Assisted Access (LTE-LAA) or LTE Unlicensed (LTE U) radio access technology or NR technology in an unlicensed band such as the 5 Ghz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

In some examples described herein, base station 105 may transmit a PSS sequence and a SSS sequence, each in a single symbol period of a given subframe, and may transmit the same PSS sequence and the same SSS sequence in other subframes. In other examples described here, base station 105 may transmit a PSS sequence and a SSS sequence within consecutive symbol periods of a single subframe. Transmitting the PSS sequence and the SSS sequence in the above manners may reduce the duration of cell acquisition by a UE 115 and/or may improve a probability of one-shot PSS and SSS detection by the UE 115.

Figure 2:
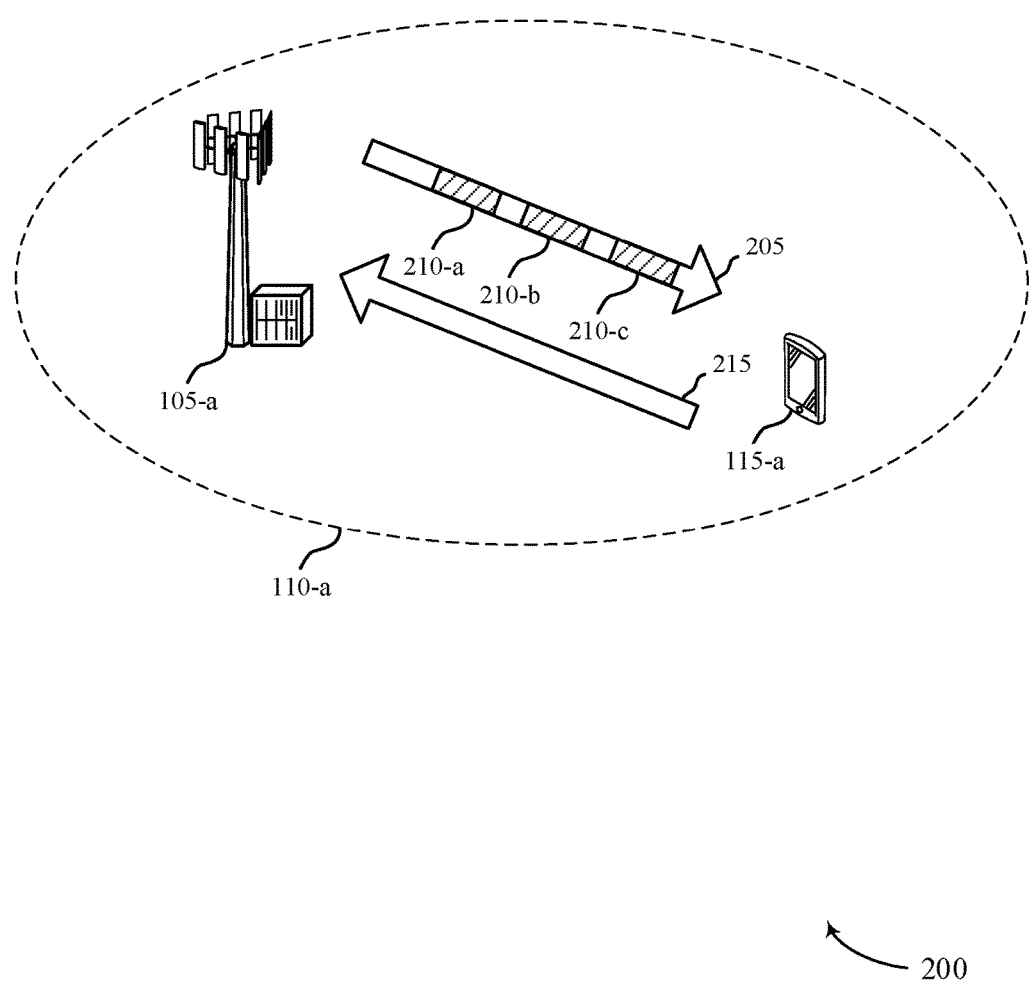
FIG. 2 illustrates an example of a wireless communications system that supports synchronization for wideband coverage enhancement in accordance with aspects of the present disclosure.

FIG. 2 illustrates an example of a wireless communications system 200 that supports synchronization for wideband coverage enhancement in accordance with various aspects of the present disclosure. Wireless communications system 200 includes base station 105-a and UE 115-a, which may be examples of aspects of the corresponding devices as described above with reference to FIG. 1. In the example of FIG. 2, the wireless communications system 200 may operate according to a radio access technology (RAT) such as a LTE, 5G, or new radio (NR) RAT, although techniques described herein may be applied to any RAT and to systems that may concurrently use two or more different RATs.

Base station 105-a may communicate with UE 115-a over a downlink carrier 205 and an uplink carrier 215. In some cases, base station 105-a may transmit frames 210 in allocated time and frequency resources using the downlink carrier 205. The transmitted frames 210 may include synchronization signals that may be used by UE 115-a for cell acquisition. In some cases, base station 105-a may transmit using mmW frequencies.

Figure 3:
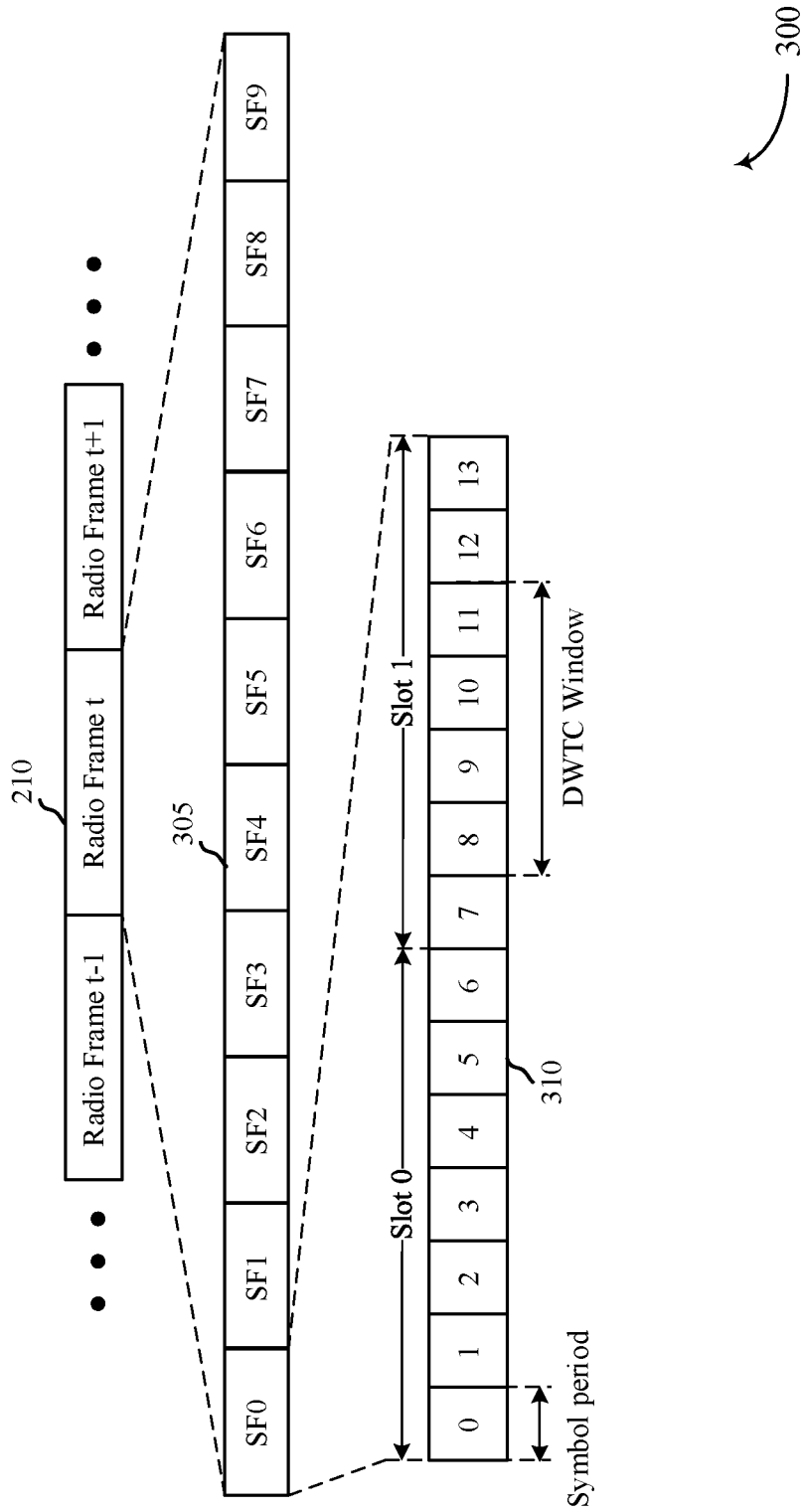
FIG. 3 illustrates an example of a frame structure that supports synchronization for wideband coverage enhancement in accordance with aspects of the present disclosure.

FIG. 3 illustrates an example of a frame structure 300 that supports synchronization for wideband coverage enhancement in accordance with various aspects of the present disclosure. The transmission timeline in the downlink may be partitioned into units of radio frames. Each radio frame may have a defined duration (e.g., 10 milliseconds (ms)) and may be partitioned into a defined number of subframes having corresponding indices (e.g., 10 subframes with indices of 0 through 9). Each subframe may include two slots. Each radio frame 210 may include 20 slots with indices of 0 through 19. Each slot may include L symbol periods, e.g., L=7 symbol periods for a normal cyclic prefix (as shown in FIG. 2) or L=6 symbol periods for an extended cyclic prefix. The 2L symbol periods in each subframe may be assigned indices of 0 through 2L−1. The available time and frequency resources may be partitioned into resource blocks. Each resource block may cover N subcarriers (e.g., 12 subcarriers) in one slot. A number of resource elements may be available in each symbol period. Each resource element (RE) may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. In some cases, a DMTC window may be defined within a subframe that may be used to transport PSS, SSS, or both.

Figure 4:
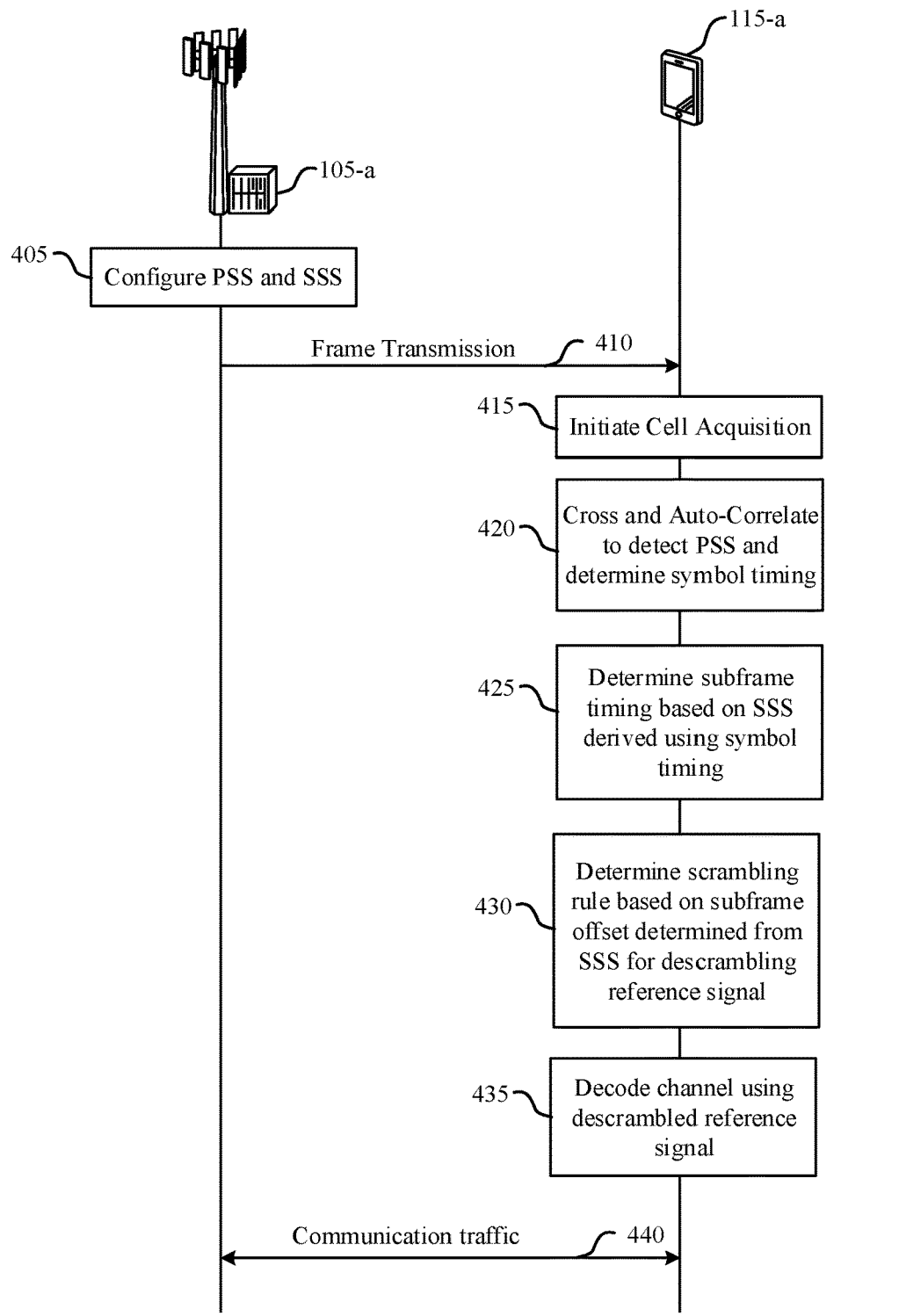
FIG. 4 illustrates an example of a process flowchart that supports synchronization for wideband coverage enhancement in accordance with aspects of the present disclosure.

FIG. 4 illustrates an example of a process flowchart 400 that supports synchronization for wideband coverage enhancement in accordance with various aspects of the present disclosure. In flowchart 400, a base station 105-a may transmit frames including synchronization signals which the UE 115-a may use to obtain symbol and subframe timing for cell acquisition.

At 405, the base station 105-a may configure synchronization signals for transmission in a frame.

In an example, the synchronization signals may include a PSS sequence and a SSS sequence, where each of the PSS sequence and the SSS sequence are transmitted in respective single symbol periods of a given subframe. Here, in a first subframe, the PSS sequence is transmitted after the SSS sequence and before a set of other sequences corresponding to a set of other synchronization signals (e.g., a legacy PSS, a legacy SSS). In other subframes (e.g., three subframes after the first subframe), the PSS sequence is transmitted after the set of sequences corresponding to the set of other synchronization signals and before the SSS sequence. In other words, in the other subframes, the location of the PSS sequence and the SSS sequence is swapped with the location of the set of other sequences (e.g., as compared to the first subframe), and the PSS is transmitted before the SSS (e.g., rather than after the SSS as in the first subframe).

In another example, the synchronization signals may include a PSS sequence transmitted in a first set of consecutive symbols of a subframe and a SSS sequence transmitted in a second set of consecutive symbols of the subframe. As a particular example, the PSS sequence may be transmitted six times in the subframe, where each transmission of the PSS sequence is in one of a first set of six consecutive symbols of the subframe (e.g., symbols 2 through 7). Here, the SSS sequence may also be transmitted six times in the subframe, where each transmission of the SSS sequence is in one of a second set of six consecutive symbols of the subframe (e.g., symbols 8 through 13).

To enable robust PSS detection, the PSS may be a single sequence. In some examples, the base station 105-a may transmit the PSS and SSS around a center frequency of a system bandwidth allocated for transmitting the frames 210. Additional aspects of configuring PSS and SSS are described below in FIGS. 5-8B.

At 410, the base station 105-a may transmit frames 210 including the PSS and SSS. At 415, the UE 115-a may use to frames 210 initiate cell acquisition. In an example, the UE 115-a may be powered on and begin searching for a cell with which to connect.

At 420, the UE 115-a may perform cross-correlation and auto-correlation to detect the PSS and to determine symbol timing of symbol periods of subframes transmitted by the base station 105. The symbol timing may enable the UE 115-a to detect the boundaries of each symbol within a frame 210. When the PSS is transmitted in either of the above described manners, the probability of the UE 115-a detecting the PSS and determining the symbol timing within a single DMTC window is improved, thus resulting in an improved one-shot PSS detection rate. Additional aspects of PSS detection are described below in FIG. 9.

At 425, the UE 115-a may use the symbol timing to generate a SSS from a signal received from the base station, and determine subframe timing based on the SSS. Additional aspects of SSS detection are described below in FIG. 10.

At 430, the UE 115-a may determine a subframe offset from the SSS, and determine a scrambling rule for a reference signal based on the subframe offset. In some examples, a reference signal may be a discovery reference signal (DRS), a cell-specific reference signal (CRS), a channel state information reference signal (CSI-RS), and/or the like.

At 435, the UE 115-a may descramble the reference signal using the scrambling rule, and decode a channel of the frame 210 using the descrambled reference signal. Additional aspects of descrambling are described below in FIG. 10. At 440, the UE 115-a may complete cell acquisition and exchange traffic with the base station 105-a using the symbol and subframe timing.

Figure 5:
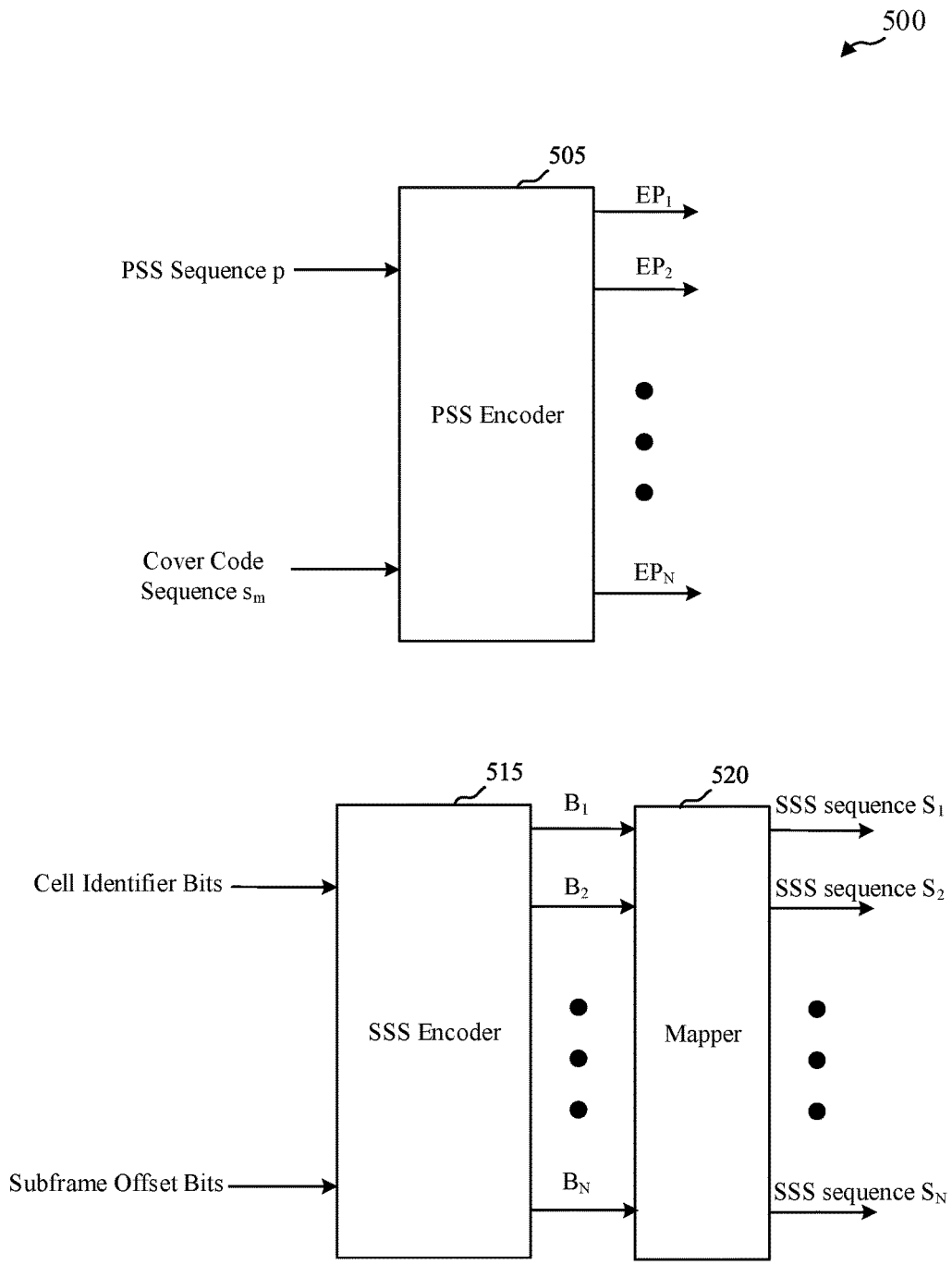
FIG. 5 illustrates an example of a primary synchronization signal (PSS) encoder and a secondary synchronization signal (SSS) encoder that supports synchronization for wideband coverage enhancement in accordance with aspects of the present disclosure.

FIGS. 5-8B depict additional aspects of the base station 105-a configuring PSS and SSS at 415. FIG. 5 illustrates an example of diagram 500 of a PSS encoder and a SSS encoder that supports synchronization for wideband coverage enhancement in accordance with various aspects of the present disclosure. The base station 105-a may include a PSS encoder 505 and an SSS encoder 515. The PSS encoder 505 may receive a PSS sequence p and a cover code sequence $s_m$, and output an encoded PSS sequence EP 510. The PSS sequence p may be a single sequence that is known by each of the base station 105-*a* and UE 115-*a* to improve robustness of PSS detection. In an example, the PSS sequence may have a sequence of length 63 and, in some examples, may be a Zadoff-Chu (ZC) sequence with a particular root index. In some aspects, the PSS sequence may correspond to a cell identifier associated with the base station 105-*a*. For example, the PSS sequence may be generated based on a particular root of a set of roots (e.g., 25, 29, and 34), where each root of the set of roots corresponds to a different cell identifier of a set of cell identifiers (e.g., 0, 1, and 2) associated with the base station 105-*a*. In some aspects, the UE 115 may determine a physical cell identity, associated with the base station 105-*a*, based at least in part the cell identifier derived from the PSS and a cell identifier group derived from the SSS, as described below.

The cover code sequence $s_m$ may be a binary code selected to have low correlation with other sequences. An example of the cover code sequence $s_m$ is $s_m=[s_0, s_1, \ldots s_X]=[1\ 1\ 1\ 1\ -1\ -1\ 1\ 1\ 1\ -1\ 1\ -1]$. In some aspects, the cover code may be a non-binary code. X may be an integer and may correspond to the number of consecutive symbol periods within a subframe in which a PSS is sent. In an example, the PSS encoder 505 may multiply the PSS sequence p and a cover code sequence $s_m$ to generate the PSS sequence EP.

The SSS encoder 515 may receive cell identifier group bits and subframe offset bits, and output codewords from an alphabet that are each mapped to a SSS sequence. The cell identifier group bits may convey a cell identifier group of the base station 105-*a*. For example, a cell identifier group may be used to signify the base station as being included in one of a defined number of cell identity groups (e.g., one of 168 cell identifier groups). The subframe offset bits may indicate an offset of a reference signal (e.g., DRS) relative to a beginning of a frame 210. The subframe offset may signify which of multiple scrambling rules use to descramble the reference signal. The UE 115-*a* may use the descrambled reference signal to decode a PBCH.

In some examples, the SSS encoder 515 may be a shortened Reed Solomon (RS) encoder operating in a Galois Field (GF) of 16. A shortened Reed Solomon encoder may translate input bits (e.g., 8 bits corresponding to the cell identifier group and 4 or 5 bits corresponding to the subframe offset) to a codeword within a codeword alphabet. For instance, the shortened Reed Solomon encoder may generate a shortened RS code in GF(16) with message length k=3 and code word length of N=6 or 7. A generator polynomial for a shortened RS(6 or 7,3) code is $g(x)=\Pi_{i=1}^{3/4}(x+\alpha^i)$, where α is the primitive element based on primitive polynomial $p(x)=1+x+x^4$. In some examples, a minimum distance may be specified for the shortened RS code (e.g., the minimum distance of the RS code is $d_{min}=4/5$).

The SSS encoder 515 may provide a mapping between a GF(16) alphabet A to an alphabet B, were each alphabet A and B is a defined number of bits (e.g., 4 bits). The alphabet A may include a set of codewords [A1, A2, A3, A4] that the SSS encoder 435 may map to a set of codewords [B1, B2, ..., $B_N$] in alphabet B. The SSS encoder 435 may output codewords $B_1, B_2, \ldots, B_N$ from alphabet B to the mapper 520.

The mapper 520 may determine a value of each codeword $B_1, B_2, \ldots, B_N$ that may be used to index a table for generating a SSS sequence. FIG. 6 illustrates an example of tables 600-*a*, 600-*b* that support synchronization for wideband coverage enhancement in accordance with various aspects of the present disclosure. The table 600-*a* may include indexes 605-*a* that each correspond to root μ 610-*a* and a cyclic shift η 615-*a*. In some examples, the two sequences with roots R1 and R2, or R3 and R4, may be complex symmetric. The SSS sequence may be encoded with the cell identifier group and optionally with the subframe offset, and the UE 115-*a* may decode a set of SSS sequences to determine the cell identifier group and optionally the subframe offset. In an example, suppose $B_1=0$, the mapper 520 retrieves root R1 and cyclic shift C11 for index k=0 from table 600 and generates SSS sequence $S_1$ as a function of root R1 and cyclic shift C11. The SS sequence may be, for example, a ZC sequence. Suppose $B_2=7$, the mapper 520 retrieves root R2 and cyclic shift C24 corresponding to index k=7 from table 600 and generates a SSS sequence $S_2$ as a function of root R2 and cyclic shift C24. This process may be repeated to generate SSS sequences $S_3$ to $S_N$ respectively corresponding to codewords $B_3, \ldots B_N$. Table 600-*b* depicts example values of a root μ 610-*b* and a cyclic shift η 615-*b* for the different indexes 605-*b*. In some examples, root 9 and 54, and root 13 and 50 are complex conjugates, and cyclic shifts within a root may be maximized.

Figure 7A:
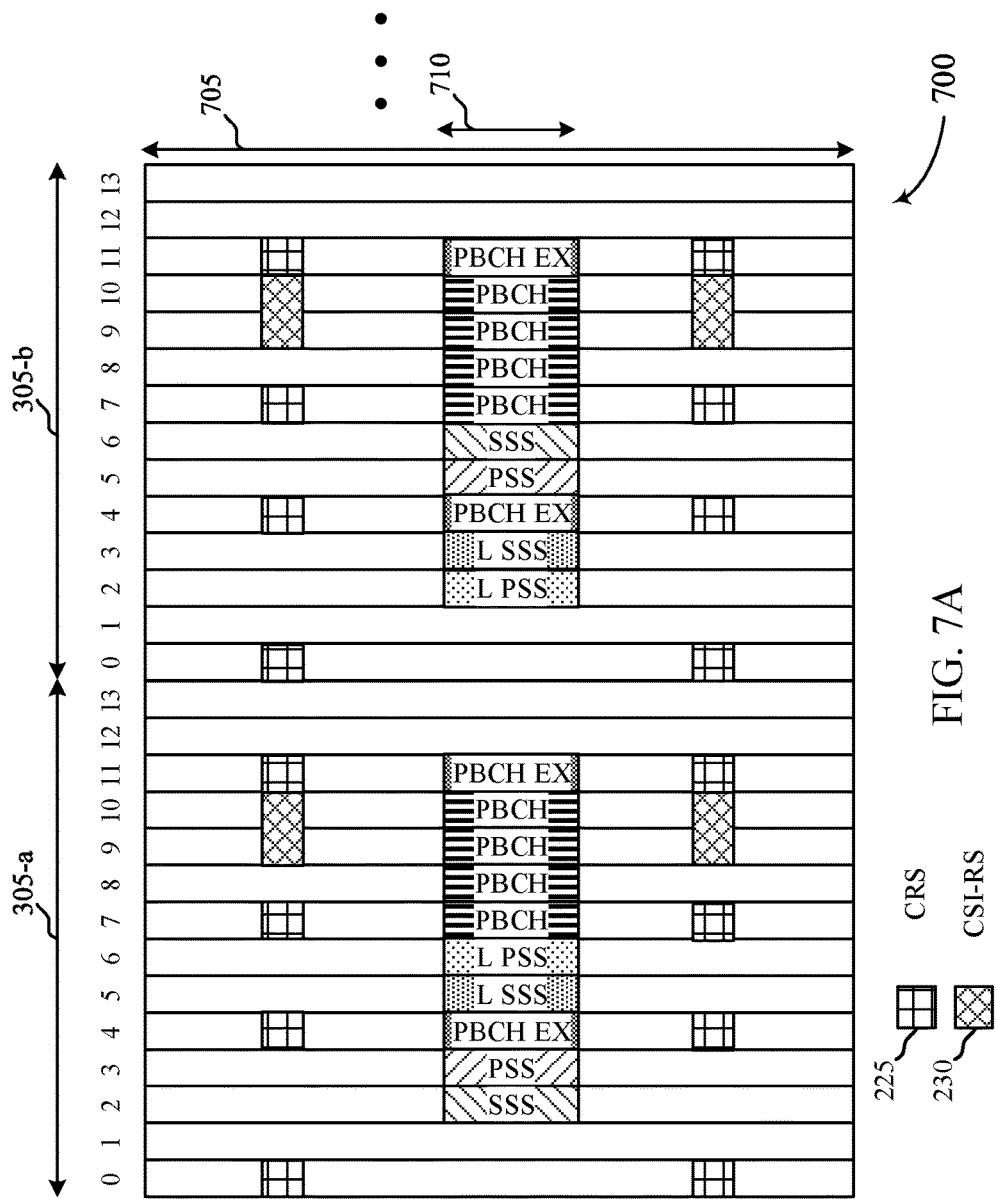
FIGS. 7A and 7B illustrate an example of subframes that support synchronization for wideband coverage enhancement in accordance with aspects of the present disclosure.
Figure 7B:
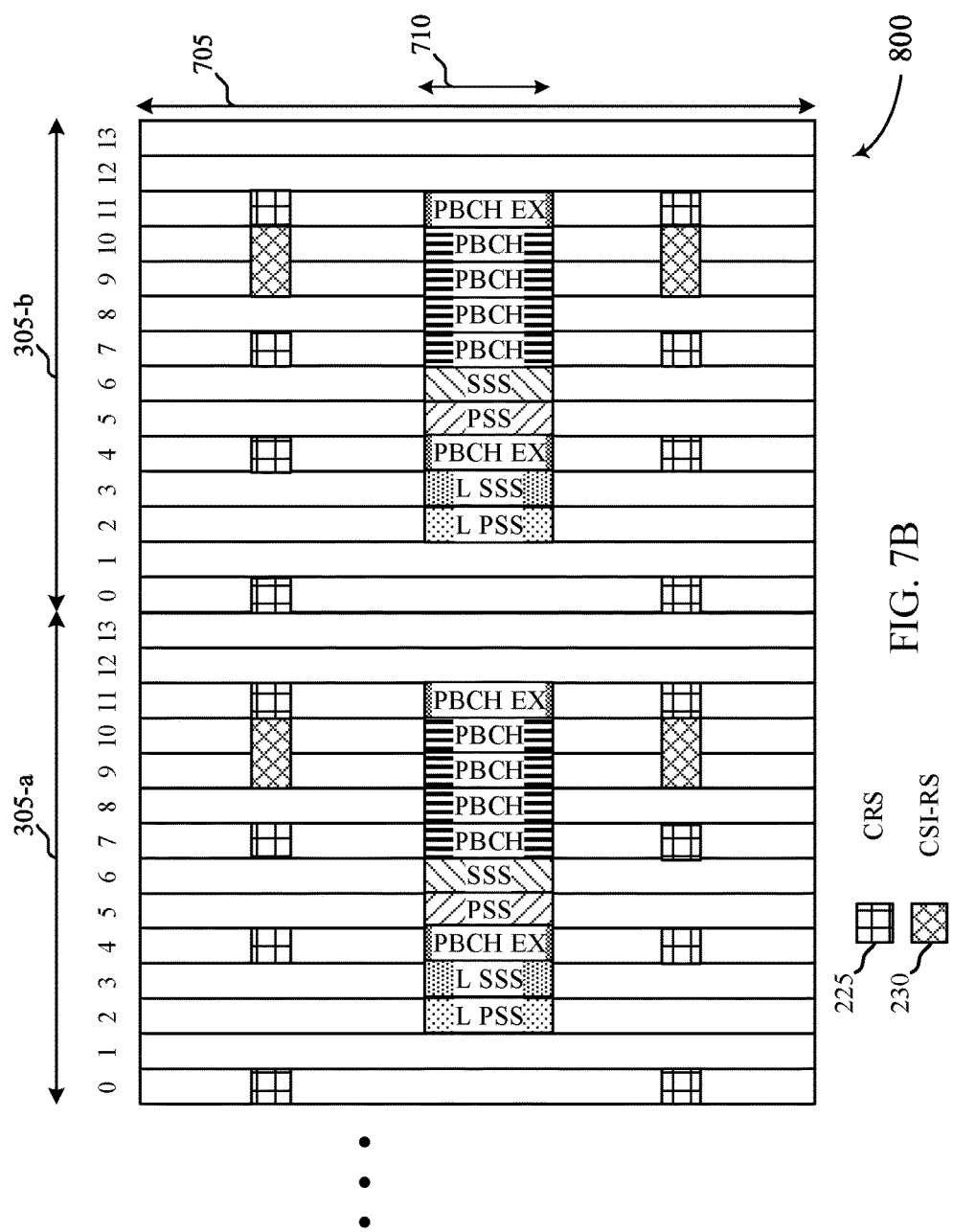
Figure 8A:
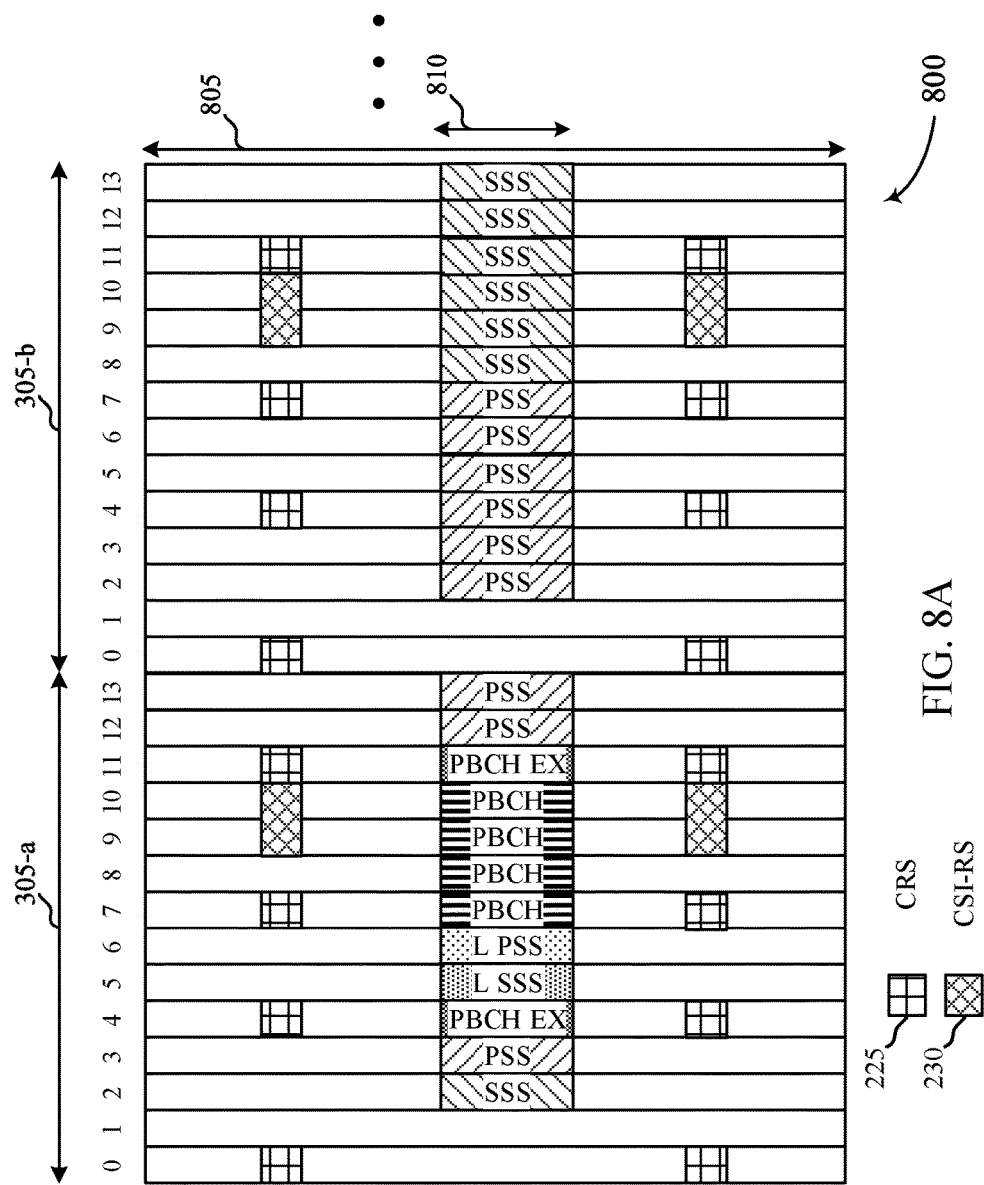
FIGS. 8A and 8B illustrate an example of subframes that support synchronization for wideband coverage enhancement in accordance with aspects of the present disclosure.
Figure 8B:
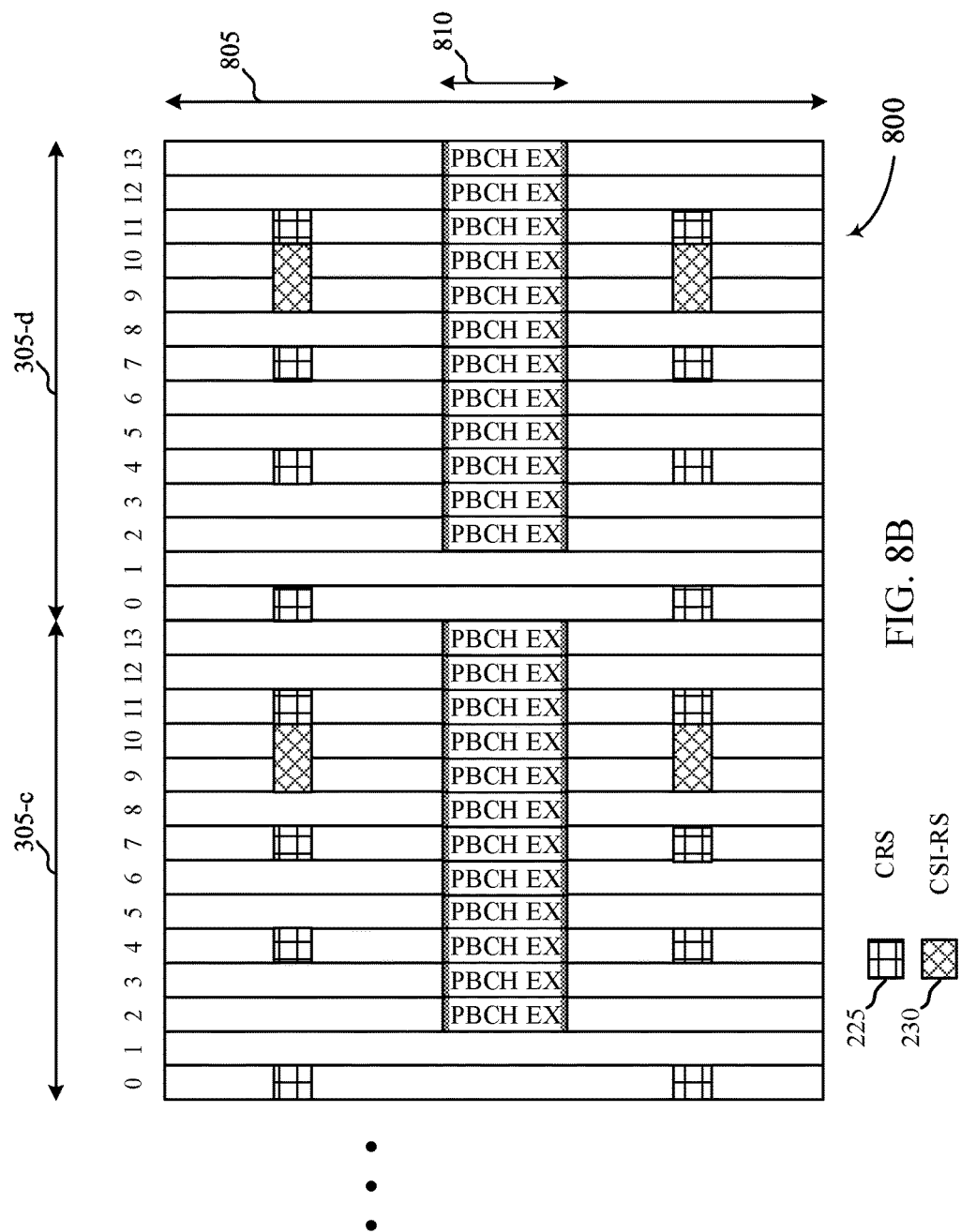

The base station 105-*a* may map the encoded PSS sequence $EP_1$ to $EP_N$ and the SSS sequences $S_1$ to $S_N$ to particular OFDM symbols and sub-carriers within a channel bandwidth for transmission to the UE 115-*a*. FIGS. 7A and 7B illustrate an example diagram 700 of subframes that support synchronization for wideband coverage enhancement, and FIGS. 8A and 8B illustrate an example diagram 800 of subframes that support synchronization for wideband coverage enhancement, in accordance with various aspects of the present disclosure. In example diagrams 700 and 800, time is depicted from left to right, and frequency is depicted from top to bottom. Base station 105-*a* may allocate time and frequency resources for frame transmission.

In example diagram 700, channel bandwidth 705 spans a portion of available frequencies, and OFDM symbols 0 to 13 of each subframe 305-*a* to 305-*d* within the bandwidth 705 are labeled across the top of the allocated resources. As discussed above, the PSS and the SSS may be transported on R sub-carriers 710 centered within the bandwidth 705. Each of the R sub-carriers 710 may be offset by one another in frequency (e.g., 15 kHz between each sub-carrier). As shown in example diagram 700, to aid PSS detection, the base station 105-*a* may transmit the PSS within a set of consecutive subframes (e.g., within symbol 3 of subframe 305-*a*, within symbol 5 of each of subframes 305-*b* through 305-*d*). For example, if R=63, and the PSS sequence p may be a ZC sequence having a length of 63, the 63 complex numbers of the ZC sequence may be mapped to 63 sub-carriers centered within the bandwidth 705. As described above, the ZC sequence may be selected based at least in part on a cell identifier associated with the base station 105-*a* (e.g., one of the three ZC sequences may be selected). The same R sub-carriers 710 may also be used to transport SSS and PBCH (or PBCH extension (PBCH Ex)) in subframes 305-*a* through 305-*d*. For example, to aid SSS detection, the base station 105-*a* may transmit the SSS within the set of consecutive subframes (e.g., within symbol 2 of subframe 305-*a*, within symbol 6 of each of subframes 305-*b* through 305-*d*).

The unlabeled portions of the time and frequency resources of subframes 305-*a* to 305-*d* may be used to transport other information, such as, for example, legacy DRS, legacy PSS, legacy SSS, MF 1.0 ePSS, MF 1.0 eSSS, legacy Physical downlink Control Channel (PDCCH), SIB, MF SIB, PDCCH for SIB, and/or the like.

As shown in example diagram 700, each of the PSS and the SSS are transmitted in respective single symbol periods of a given subframe. As shown in subframe 305-*a*, the PSS sequence may be transmitted after the SSS sequence (e.g., the PSS may be transmitted in symbol 3, while the SSS may be transmitted in symbol 2) and before a legacy SSS and a legacy PSS (e.g., transmitted in symbol 6 and symbol 5, respectively). As shown in subframes 305-*b* through 305-*d*, the PSS sequence may be transmitted before the SSS sequence (e.g., the PSS may be transmitted in symbol 5, while the SSS may be transmitted in symbol 6) and after the legacy PSS and the legacy SSS (e.g., transmitted in symbol 2 and symbol 3, respectively).

In this example, in subframes 305-*b* through 305-*d*, the PSS is transmitted before the SSS (e.g., rather than after the SSS as in subframe 305-*a*). In some aspects, transmitting the PSS before the SSS (e.g., rather than after the SSS as in subframe 305-*a*) prevents a legacy UE (e.g., a UE that uses the legacy PSS and the legacy SSS alone to perform synchronization) from attempting synchronization based on the PSS and the SSS, thereby conserving battery power and/or processor resources of the legacy UE. For example, since no SSS is present before the PSS in subframes 305-*b* through 305-*d*, the legacy UE will stop a synchronization procedure and/or not attempt to decode a PBCH associated with these subframes, which conserves battery power and/or processor resources of the legacy UE.

Further, in subframes 305-*b* through 305-*d*, the location of the PSS and the SSS is swapped with the location of the legacy PSS and the legacy SSS (e.g., as compared to subframe 305-*a*). For example, in subframe 305-*a*, the SSS and the PSS are transmitted in symbols 2 and 3, respectively, and the legacy SSS and the legacy PSS are transmitted in symbols 5 and 6, respectively. However, in subframes 305-*b* through 305-*d*, the PSS and the SSS are transmitted in symbols 5 and 6, respectively, and the legacy PSS and the legacy SSS are transmitted in symbols 2 and 3, respectively. In some aspects, swapping the locations of the PSS/SSS and the legacy PSS/legacy SSS improves the likelihood of UE 115 being able to identify the start of the subframe (e.g., since the PSS/SSS are transmitted later in the subframe). Furthermore, in some aspects, the SSS may be a same sequence as the legacy SSS, which reduces complexity at base station 105-*a* and UE 115.

In example diagram 800, channel bandwidth 805 spans a portion of available frequencies, and OFDM symbols 0 to 13 of each subframe 305-*a* to 305-*d* within the bandwidth 805 are labeled across the top of the allocated resources. As discussed above, the PSS and the SSS may be transported on R sub-carriers 810 centered within the bandwidth 805. Each of the R sub-carriers 810 may be offset by one another in frequency (e.g., 15 kHz between each sub-carrier). As shown in example diagram 800, to aid PSS detection, the base station 105-*a* may transmit the PSS within a same subframe (e.g., within symbols 2-7 of subframe 305-*b*). For example, if R=63, and the PSS sequence p may be a ZC sequence having a length of 63, the 63 complex numbers of the ZC sequence may be mapped to 63 sub-carriers centered within the bandwidth 805. As described above, the ZC sequence may be selected based on a cell identifier associated with the base station 105-*a* (e.g., one of the three ZC sequences may be selected). In some aspects, a ZC sequence with a low correlation with a sequence associated with the legacy PSS may be selected. In some aspects, the PSS may be combined with a legacy PSS (e.g., by UE 115) in order to perform synchronization.

As further shown, the same R sub-carriers 810 may also be used to transport SSS and PBCH (or PBCH extension (PBCH Ex)) in subframes 305. As further shown, to aid SSS detection, the base station 105-*a* may transmit the SSS within the same subframe as that in which the PSS is transmitted (e.g., within symbols 8-13 of subframe 305-*b*). In some aspects, the PSS and the SSS may be transmitted in an equal number of consecutive symbols (e.g., transmission of the PSS and the SSS in two sets of six consecutive symbols is shown in FIG. 8A). In some aspects, the PSS and the SSS may be transmitted in a different number of consecutive symbols in the subframe (e.g., the PSS may be transmitted in symbols 2-6 of the subframe and the SSS may be transmitted in symbols 7-13 of the subframe, the PSS may be transmitted in symbols 2-9 of the subframe and the SSS may be transmitted in symbols 10-13, and/or the like).

The unlabeled portions of the time and frequency resources of subframes 305-*a* to 305-*d* may be used to transport other information, such as, for example, legacy DRS, legacy PSS, legacy SSS, MF 1.0 ePSS, MF 1.0 eSSS, legacy Physical downlink Control Channel (PDCCH), SIB, MF SIB, PDCCH for SIB, and/or the like.

In some aspects, having all of the PSS symbols and the SSS symbols in a single subframe beneficially saves buffer hardware of UE 115 (e.g., since the PSS and the SSS do not need to be buffered during multiple subframes). In some aspects, the transmission techniques of example diagrams 700 and 800 reduce the duration of cell acquisition by UE 115 and provide an improved rate of one-shot PSS and SSS detection.

Figure 9:
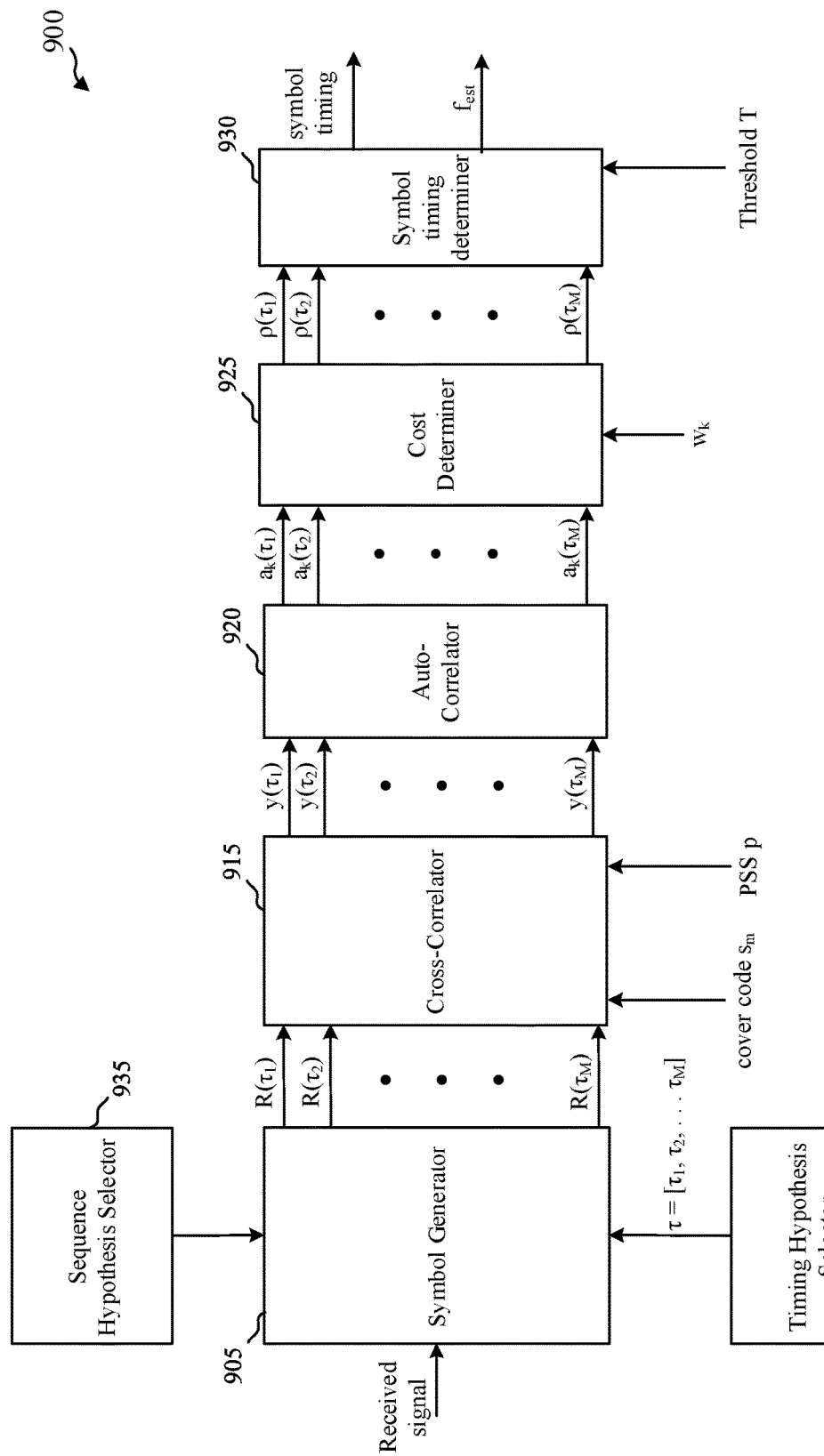
FIG. 9 illustrates an example of a PSS detector that supports synchronization for wideband coverage enhancement in accordance with aspects of the present disclosure.

A PSS detector of the UE 115-*a* may detect a PSS within a subframe 305 for determining symbol timing of the symbol periods and for determining a cell identifier within a cell identifier group of base station 105. FIG. 9 illustrates an example of a PSS detector 900 that supports synchronization for wideband coverage enhancement in accordance with various aspects of the present disclosure. The PSS detector 900 may include a symbol generator 905, a timing hypothesis selector 910, a cross-correlator 915, an auto-correlator 920, a cost determiner 925, and a symbol timing determiner 930.

The UE 115-*a* may receive a signal transmitted by the base station 105-*a* and provide the received signal to the symbol generator 905. The UE 115-*a* may include a mixer and a cyclic prefix remover, for example, that process the signal prior to input to the symbol generator 905. The symbol generator 905 may receive a set of timing hypotheses $\tau=[\tau_1, \tau_2, \ldots \tau_M]$ from the timing hypothesis selector 910, and the symbol generator 905 may generate a set of symbols from the received signal for each timing hypothesis in the set. A timing hypothesis may be a candidate time interval for when a symbol period begins and ends (see FIG. 3). Each timing hypothesis in the set may be offset from each other in time, and the UE 115-*a* may check each timing hypothesis in the set to identify which candidate time interval lines up best with the boundaries of the symbol period (see FIG. 3).

The symbol generator 905 may perform time domain processing, frequency domain processing, or both, on the received signal to generate symbols from the received signal at each timing hypothesis. In an example, the symbol generator 905 may generate the received signals using a fast Fourier transform (FFT). Each generated symbol may be a complex number observed at each of the R sub-carriers 710/810.

In a case where base station 105-*a* transmits the same PSS sequence in a defined number X (X≥1) of consecutive symbol periods within a single subframe 305, the symbol generator 905 generates column vectors of measured symbols for the defined number X of consecutive symbol periods. For example, for each frequency bin (e.g., portion of spectrum corresponding to a sub-carrier) and when X=6, the symbol generator 905 may partition 6 received symbols with timing hypotheses r into 6 column vectors using the following equation:

$$R(\tau)=[r_0, r_1, \ldots r_5]$$

For example, if the PSS sequence has a length of 63 and is sent in 6 consecutive OFDM symbols, the symbol generator 905 processes the received signal to generate a column vector r having 63 symbols in each of 6 consecutive symbol periods. The symbol generator 905 outputs to the cross-correlator 915 a matrix R that includes the 6 column vectors r for each timing hypothesis in the set.

The cross-correlator 915 performs a per symbol cross-correlation within a channel coherence time between the PSS sequence p and the cover code $s_m$ for each timing hypothesis to generate cross-correlation symbols y using the following equation:

$$y(\tau)=[y_0, y_1, \ldots, y_5]=p^H \cdot [s_0 r_0, s_1 r_1, \ldots, s_5 r_5]$$

The PSS sequence p and the cover code $s_m$ may be known by the UE 115-a, and the UE 115-a may use knowledge of the PSS sequence p and the cover code $s_m$ attempting to identify the boundaries of the symbol periods. The cross-correlator 915 outputs the cross-correlation symbols y to the auto-correlator 920.

The auto-correlator 920 may perform a symbol by symbol auto-correlation that is robust to a frequency offset to coherently combine the cross-correlation symbols y. Frequency offset may be the difference between frequencies used by the base station 105-a to transmit the sub-carriers and the frequencies used by the UE 115-a to demodulate the sub-carriers. The auto-correlator 920 may perform the auto-correlation on each timing hypothesis using the following equation:

$$a_k(\tau) = \frac{1}{6-k} \sum_m y_{m+k} y_m^*$$

In this example, k=X−1. Conventional techniques have avoided auto-correlation in scenarios where SNR is low. The examples described herein improve over conventional techniques due to the symbol to symbol auto-correlation capturing frequency offset and coherently combining symbols to reduce noise. The auto-correlator 920 may output the auto-correlation values $a_k$ for each timing hypothesis to the cost determiner 925.

The cost determiner 925 may compute a cost function based on the auto-correlation values $a_k$ using the following equation:

$$\rho(\tau) = a_1 \cdot |a_1| + \sum_{k=1}^{3} w_k \cdot a_{k+1}(\tau) \cdot a_k^*(\tau)$$

The variable $w_k$ may be a weighting factor of an auto-correlation with lag k. The cost determiner 925 may output the cost values ρ for each timing hypothesis to the symbol timing determiner 930.

The symbol timing determiner 930 may determine which timing hypothesis best corresponds to the symbol timing used by the base station 105-a. In some examples, the symbol timing determiner 930 may perform PSS detection according to the following equation:

$$\max_\tau \left\{ \frac{|\rho(\tau)|}{|\bar{\rho}|} \right\} <> \text{threshold } T$$

$|\bar{\rho}|$ may represent the average cost ρ(τ) of the timing hypotheses.

For timing estimation, the UE 115-a may select timing hypothesis T that maximizes the ratio. The UE 115-a determines that PSS has been detected if the maximum value of the ratio satisfies the threshold T. If less than T, the UE 115-a declares that PSS has not been detected and the corresponding timing hypothesis is not valid. If the ratio is greater than T, the UE 115-a determines that PSS has been detected and may select the timing hypothesis τ that maximizes the ratio as the symbol timing. The timing hypothesis T that maximizes the ratio and satisfies the threshold T may thus represent the timing hypothesis that best lines up with the boundaries of the symbol period. In some cases, the UE 115-a may retain the N best timing hypotheses (up to all timing hypotheses that satisfy the threshold T) and then validate one of the timing hypotheses using SSS detection.

In some examples, the symbol timing determiner 930 may generate a frequency estimate for each timing hypothesis using the following equation:

$$f_{est} = \frac{48}{137\pi} \arg\{\rho(\hat{\tau})\} \cdot 15 \text{ KHz}$$

In some cases, the PSS detector 900 may further include a sequence hypothesis selector 935 to select one out of three sequences that correspond to three hypotheses associated with determining a cell identifier within a cell identifier group. In some cases, the PSS detector 900 may determine the cell identifier (e.g., 0, 1, or 2) corresponding to the selected sequence. Thus, in some aspects, the sequence hypothesis selector 935 facilitates determination of the cell identifier based on which the physical cell identifier may be determined (e.g., in conjunction with the cell identifier group associated with the SSS).

Figure 10:
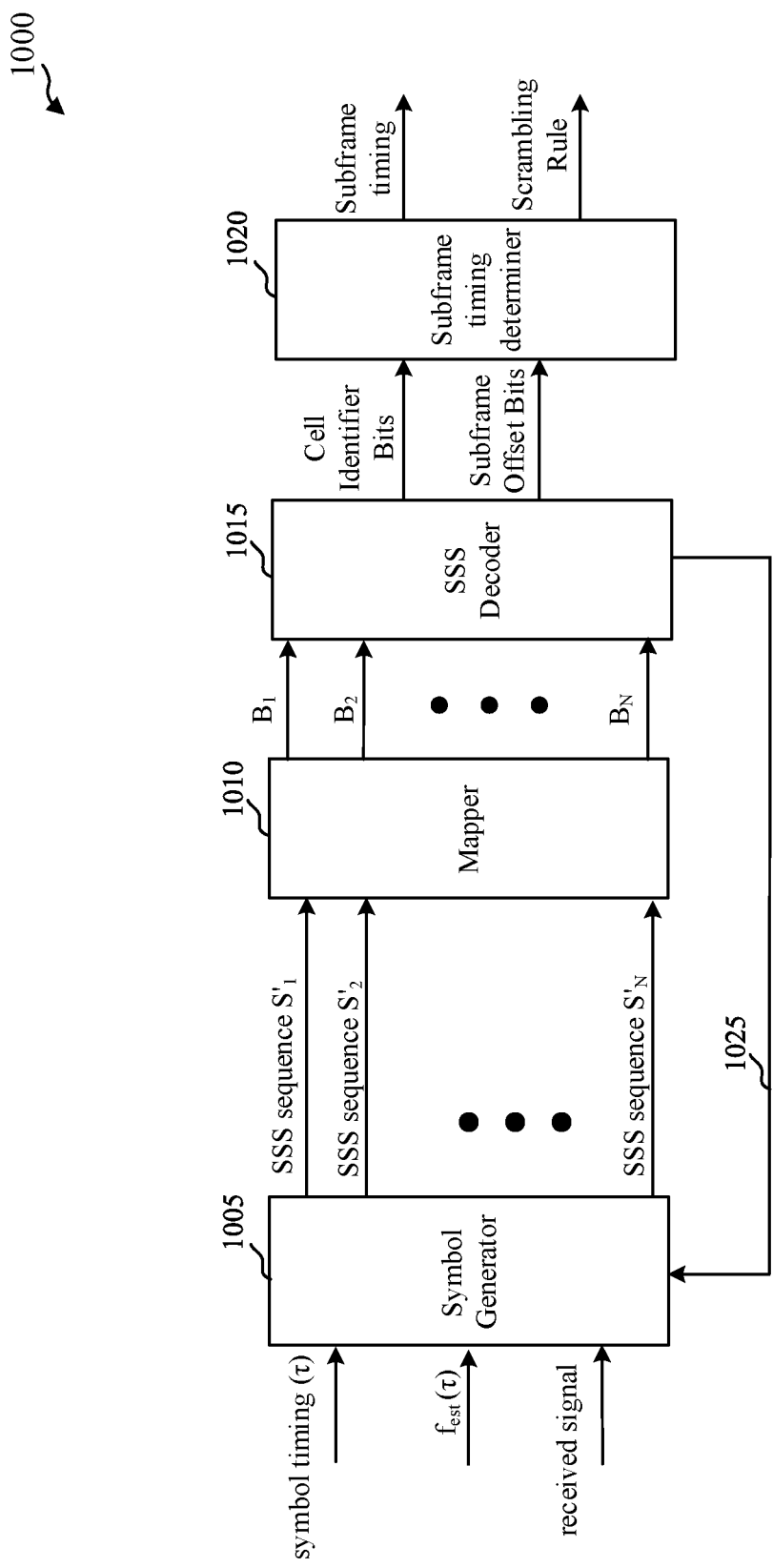
FIG. 10 illustrates an example of a SSS detector that supports synchronization for wideband coverage enhancement in accordance with aspects of the present disclosure.

An SSS detector of the UE 115-a may use the best timing hypothesis, or the N best timing hypotheses, for determining subframe timing of the base station 105-a. FIG. 10 illustrates an example of a SSS detector 1000 that supports synchronization for wideband coverage enhancement in accordance with various aspects of the present disclosure. To make PSS detection robust, the PSS is a single one sequence and hence cannot convey a cell identifier group of the base station 105-a. The SSS may be used to convey cell the cell identifier (e.g., 168 distinct cell identifiers per cell identifier group).

In a LBT environment, the base station 105 may transmit a reference signal (e.g., DRS) at any subframe in a downlink transmission (DTxW) window. The reference signal is typically scrambled and the UE determines a scrambling rule to descramble the reference signal. The UE uses the descrambled reference signal to decode a physical broadcast channel (PBCH) after PSS and SSS detection. The PBCH may include information that the UE 115 may use for cell acquisition, such as a master information block (MIB) and a system information block (SIB). Conventional systems may use multiple scrambling rules that increases complexity and prevent multiplexing of a reference signal (e.g., DRS) with other paging messages, UE data, and/or the like.

In the examples described herein, the SSS sequence may be encoded with the cell identifier group and optionally with bits to indicate subframe offset of a reference signal. Each scrambling rule may correspond to one or more subframe locations. The subframe offset may indicate a particular subframe location, and the UE 115-a may select a scrambling rule corresponding to the subframe location indicated in the subframe offset for descrambling the reference signal. Like PSS detection, the examples herein may achieve a defined one shot detection probability target by transmitting the SSS sequence in a defined number X of consecutive OFDM symbols (see FIG. 8A, symbol periods 8-13 of subframe 305-b). For example, SSS capacity at −12 dB SINR per sub-carrier with X=6 and CRS overhead factor (132/144) in an AWGN channel ($|h|^2=1$)→62*6*(132/144)*log 2(1+0.0631)=30.32 bits, and in a fading channel ($|h|^2=0.5$)→15.39 bits. A 50% one shot detection probability target→$P(|h|^2>0.5)=0.61$ can thus be achieved.

In an example, the SSS detector 1000 may include a symbol generator 1005, a mapper 1010, a SSS decoder 1015, and a subframe timing determiner 1020. The symbol generator 1005 may operate similar to the symbol generator 905. The symbol generator 1005 may receive the symbol timing and frequency estimate corresponding to the best timing hypothesis, or may receive the symbol timing and frequency estimate corresponding to some or all of the timing hypotheses that satisfy threshold T. The following describes a single timing hypothesis, and may include a feedback path 1025 to try a different timing hypothesis should a current timing hypothesis fail to properly decode.

The SSS detector 1000 may process the received signal to generate SSS symbol sequences $S'_1$ to $S'_N$ as a function of the input symbol timing and the input frequency estimate. The mapper 1010 may, using the table 600 of FIG. 6, determine a root and cyclic shift for each the SSS symbol sequences $S'_1$ to $S'_N$ to determine index values, and may respectively determine the values $B_1$ to $B_N$ using the determined index values.

The SSS decoder 1015 may attempt to decode the values $B_1$ to $B_N$ to retrieve the cell identifier group bits and the subframe offset bits. If unsuccessful and there is at least one additional timing hypothesis, the SSS decoder 1015 may output a decoding error and send a message via feedback path 1025 instructing the symbol generator 1005 to generate another set of SSS symbol sequences $S'_1$ to $S'_N$ using a different timing hypothesis. If there are no additional timing hypotheses, the SSS decoder 1015 may output a decoding error and the UE 115 may perform PSS detection a second (or subsequent) time. If able to generate cell identifier group bits and the subframe offset bits, the SSS decoder 1015 may output the cell identifier group bits and the subframe offset bits to the subframe timing determiner 1020.

The subframe timing determiner 1020 may process the cell identifier group bits and the subframe offset bits to determine a subframe timing for subframes 305 within the frame 210. In a case where the SSS sequences are transmitted in consecutive OFDM symbols (see FIG. 8A, symbol periods 8-13 of subframe 305-b), the subframe timing determiner 1020 may, upon detecting a subframe including the consecutive OFDM symbols, determine the location of the subframe 305-b within the frame 210. The subframe timing determiner 1020 may use the determined location of subframe 305-b and the symbol timing to determine the subframe timing. For example, the subframe 305 transporting SSS may be in one of multiple specified locations relative to a subframe 305 transporting PSS, and when the subframe timing determiner 1020 determines the relative locations, the subframe timing determiner 1020 may be able to determine boundaries of the frame 210 and timing of subframe boundaries within the frame 210.

In a case where the SSS sequences are transmitted in one symbol of consecutive frames (see FIG. 7A, symbol period 5 and 6 of subframe 305-a and subframes 305-b through 305-d, respectively), the subframe timing determiner 1020 may, upon detecting the SSS in the multiple subframes, determine the location of the subframes 305 within the frame 210. For example, the subframe timing determiner 1020 may identify a series of symbols that carry synchronization signals in the subframe, may determine the location of the SSS within the series of symbols, may determine boundaries of the frame 210 relative to that location, and may determine the timing of subframe boundaries within the frame 210 relative to boundaries of the frame 210.

The subframe timing determiner 1020 may also determine which scrambling rule to apply to descramble one or more reference signals. As noted above, each scrambling rule may correspond to a one or more subframe locations. The subframe timing determiner 1020 may process the subframe offset bits to determine a particular subframe location within the frame 210, and the UE 115-a may select a subframe rule corresponding to the subframe location indicated in the subframe offset for descrambling the reference signal. The UE 115-a may apply the scrambling rule to descramble a reference signal (e.g., cell-specific reference signal (CRS), channel state information reference signal (CSI-RS)) within one or more subframes, and use the descrambled reference signal to decode a PBCH (e.g., decode MIB, SIB, etc.) for completing channel acquisition.

Beneficially, the examples described herein may provide a PSS and SSS detection technique that improves a probability of one-shot detection. Moreover, the techniques described herein may encode a cell identifier group, subframe offset for a reference signal, or both, in a SSS sequence that may be used for determining subframe timing and a scrambling rule for the reference signal.

Figure 11:
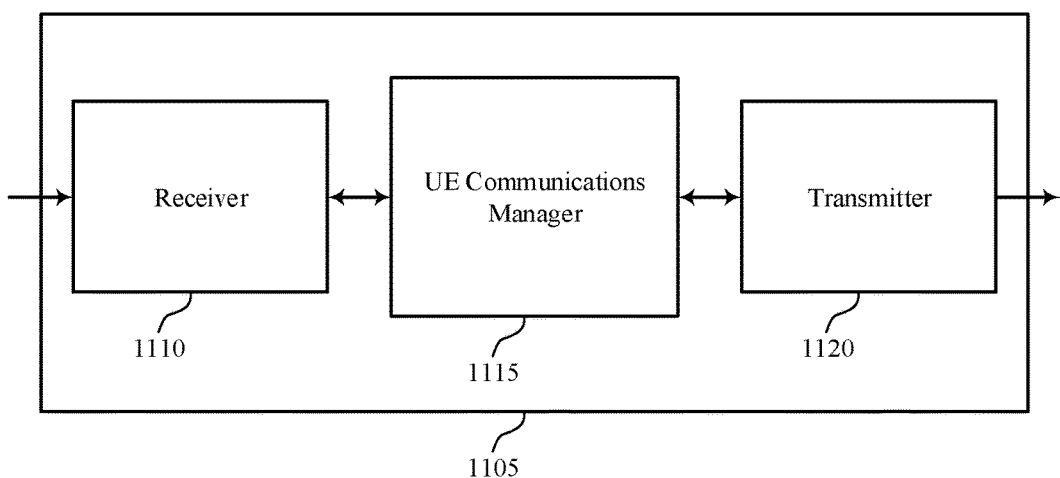
FIGS. 11 through 13 show block diagrams of a device that supports synchronization for wideband coverage enhancement in accordance with aspects of the present disclosure.

FIG. 11 shows a block diagram 1100 of a wireless device 1105 that supports synchronization for wideband coverage enhancement in accordance with aspects of the present disclosure. Wireless device 1105 may be an example of aspects of a user equipment (UE) 115 as described herein. Wireless device 1105 may include receiver 1110, UE communications manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to synchronization for wideband coverage enhancement, etc.). Information may be passed on to other components of the device. The receiver 1110 may be an example of aspects of the transceiver 1435 described with reference to FIG. 14. The receiver 1110 may utilize a single antenna or a set of antennas.

UE communications manager 1115 may be an example of aspects of the UE communications manager 1415 described with reference to FIG. 14.

UE communications manager 1115 and/or at least some of its various sub-components may be implemented in hardware, software executed by a processor, firmware, or any combination thereof. If implemented in software executed by a processor, the functions of the UE communications manager 1115 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The UE communications manager 1115 and/or at least some of its various sub-components may be physically located at various positions, including being distributed such that portions of functions are implemented at different physical locations by one or more physical devices. In some examples, UE communications manager 1115 and/or at least some of its various sub-components may be a separate and distinct component in accordance with various aspects of the present disclosure. In other examples, UE communications manager 1115 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 1115 may receive, by a UE, a signal from a base station, generate a set of symbols from the signal based on a timing hypothesis, cross-correlate the set of symbols with a sequence to generate a set of cross-correlation symbols, auto-correlate the cross-correlation symbols to generate a set of auto-correlation values, and synchronize the UE with the base station based on the auto-correlation values. The UE communications manager 1115 may also generate, by a UE, a secondary synchronization signal (SSS) sequence based on a signal transmitted by a base station, determine, by the UE, a cell identifier group of a base station based on the SSS sequence, and synchronize the UE with the base station based on the SSS sequence and the cell identifier group.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1435 described with reference to FIG. 14. The transmitter 1120 may utilize a single antenna or a set of antennas.

Figure 12:
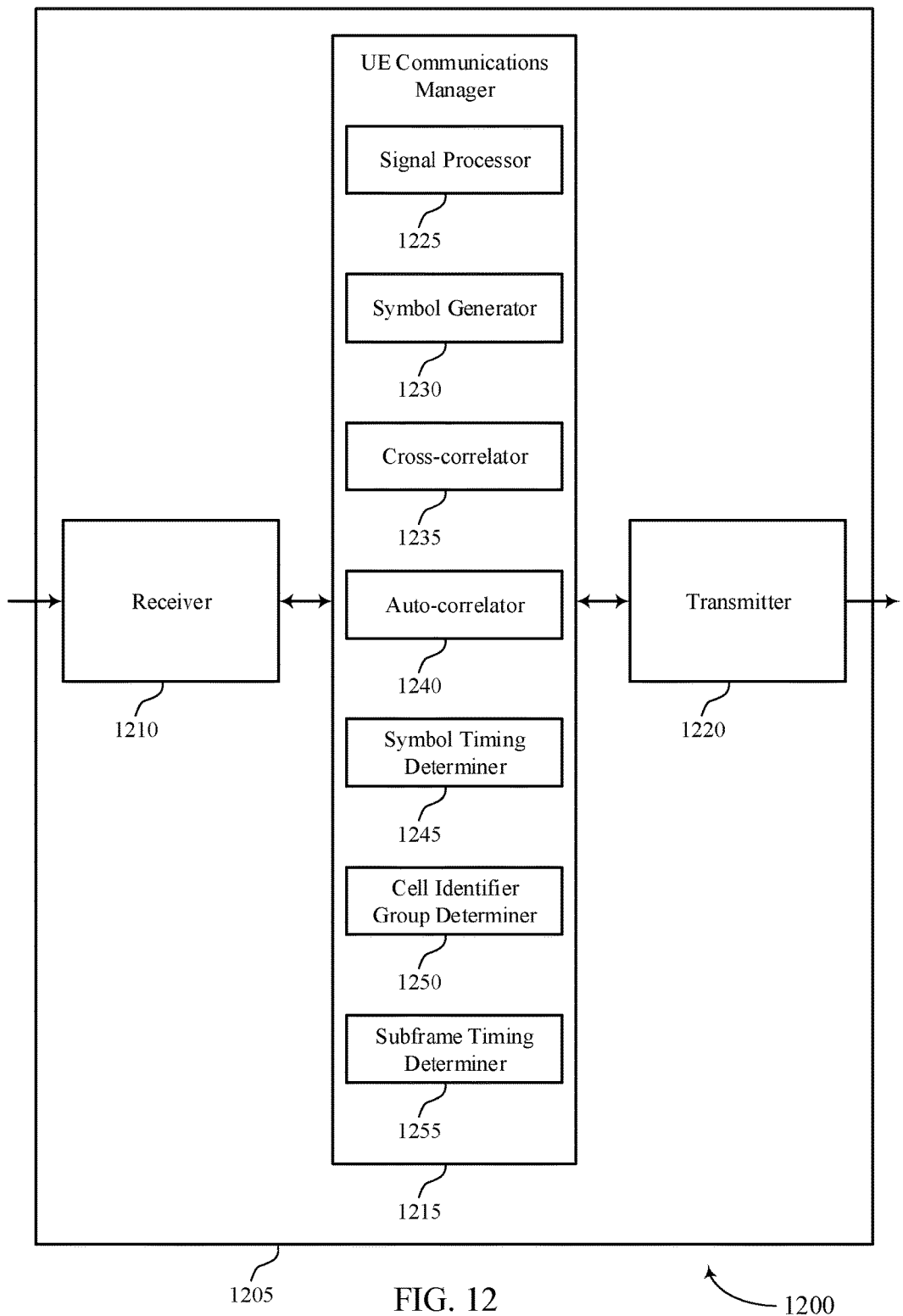

FIG. 12 shows a block diagram 1200 of a wireless device 1205 that supports synchronization for wideband coverage enhancement in accordance with aspects of the present disclosure. Wireless device 1205 may be an example of aspects of a wireless device 1105 or a UE 115 as described with reference to FIG. 11. Wireless device 1205 may include receiver 1210, UE communications manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to synchronization for wideband coverage enhancement, etc.). Information may be passed on to other components of the device. The receiver 1210 may be an example of aspects of the transceiver 1435 described with reference to FIG. 14. The receiver 1210 may utilize a single antenna or a set of antennas.

UE communications manager 1215 may be an example of aspects of the UE communications manager 1415 described with reference to FIG. 14.

UE communications manager 1215 may also include signal processor 1225, symbol generator 1230, cross-correlator 1235, auto-correlator 1240, symbol timing determiner 1245, cell identifier determiner 1250, and subframe timing determiner 1255.

Signal processor 1225 may receive a signal from a base station.

Symbol generator 1230 may generate a set of symbols from the signal based on a timing hypothesis, and generate a SSS sequence from the signal based on synchronizing the UE with the base station. In some cases, symbol generator 1230 may generate a SSS sequence based on a signal transmitted by a base station, and receive a primary synchronization signal from a base station. In some cases, generating the set of symbols from the signal based on the timing hypothesis includes: partitioning, for each frequency bin of a set of frequency bins, a defined number of symbols from the signal into a defined number of column vectors. In some cases, the SSS sequence is generated by mapping a set of codewords generated by a shortened Reed Solomon encoder using a Galois Field alphabet and a generator polynomial to the first index. In some cases, the set of symbols from the signal are generated within a time interval corresponding to a duration of one or more subframes of a frame. In some cases, generating the SSS sequence includes: mapping a set of codewords generated by an encoder operating using a Galois Field alphabet to a root and cyclic shift. In some cases, each of the set of codewords is generated by the encoder using a generator polynomial.

Cross-correlator 1235 may cross-correlate the set of symbols with a sequence to generate a set of cross-correlation symbols. In some cases, the sequence is based on a set of synchronization symbols and a cover code.

Auto-correlator 1240 may auto-correlate the cross-correlation symbols to generate a set of auto-correlation values.

Symbol timing determiner 1245 may synchronize the UE with the base station based on the auto-correlation values. In some cases, synchronizing the UE with the base station includes selecting one of the first timing hypothesis or the second timing hypothesis as a symbol timing of the base station. Symbol timing determiner 1245 establish a symbol timing based on the primary synchronization signal, where generating the SSS sequence is based on the symbol timing.

Cell identifier determiner 1250 may determine a physical cell identity of the base station based on the SSS sequence (e.g., based on a cell identifier group associated with the SSS) and the PSS sequence (e.g., based on a cell identifier associated with the PSS).

Subframe timing determiner 1255 may determine subframe timing based on the SSS sequence, synchronize the UE with the base station based on the SSS sequence and the physical cell identity, and determine a subframe offset for a reference signal based on the SSS sequence. In some cases, synchronizing the UE with the base station includes determining a subframe timing of the base station based on the SSS sequence.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1435 described with reference to FIG. 14. The transmitter 1220 may utilize a single antenna or a set of antennas.

Figure 13:
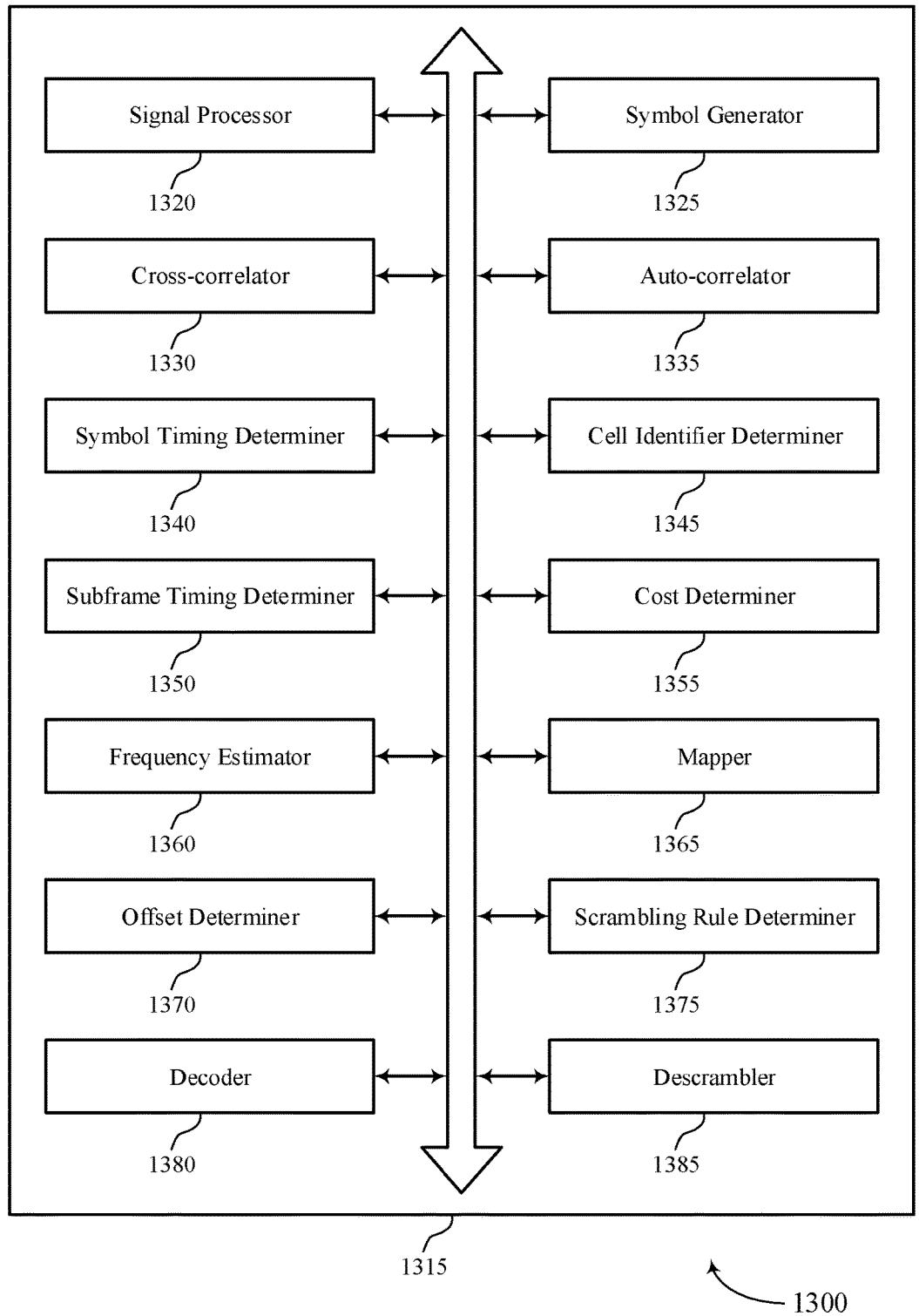

FIG. 13 shows a block diagram 1300 of a UE communications manager 1315 that supports synchronization for wideband coverage enhancement in accordance with aspects of the present disclosure. The UE communications manager 1315 may be an example of aspects of a UE communications manager 1115, a UE communications manager 1215, or a UE communications manager 1415 described with reference to FIGS. 11, 12, and 14. The UE communications manager 1315 may include signal processor 1320, symbol generator 1325, cross-correlator 1330, auto-correlator 1335, symbol timing determiner 1340, cell identifier determiner 1345, subframe timing determiner 1350, cost determiner 1355, frequency estimator 1360, mapper 1365, offset determiner 1370, scrambling rule determiner 1375, decoder 1380, and descrambler 1385. Each of these modules may communicate, directly or indirectly, with one another (e.g., via one or more buses).

Signal processor 1320 may receive a signal from a base station.

Symbol generator 1325 may generate a set of symbols from the signal based on a timing hypothesis, and generate a SSS sequence from the signal based on synchronizing the UE with the base station. In some cases, symbol generator 1325 may generate a SSS sequence based on a signal transmitted by a base station, and receive a primary synchronization signal from a base station. In some cases, generating the set of symbols from the signal based on the timing hypothesis includes partitioning, for each frequency bin of a set of frequency bins, a defined number of symbols from the signal into a defined number of column vectors. In some cases, the SSS sequence is generated by mapping a set of codewords generated by a shortened Reed Solomon encoder using a Galois Field alphabet and a generator polynomial to the first index. In some cases, the set of symbols from the signal are generated within a time interval corresponding to a duration of one or more subframes of a frame. In some cases, generating the SSS sequence includes mapping a set of codewords generated by an encoder operating using a Galois Field alphabet to a root and cyclic shift. In some cases, each of the set of codewords is generated by the encoder using a generator polynomial.

Cross-correlator 1330 may cross-correlate the set of symbols with a sequence to generate a set of cross-correlation symbols. In some cases, the sequence is based on a set of synchronization symbols and a cover code.

Auto-correlator 1335 may auto-correlate the cross-correlation symbols to generate a set of auto-correlation values.

Symbol timing determiner 1340 may synchronize the UE with the base station based on the auto-correlation values. In some cases, synchronizing the UE with the base station includes selecting one of the first timing hypothesis or the second timing hypothesis as a symbol timing of the base station. Symbol timing determiner 1340 may establish a symbol timing based on the primary synchronization signal, where generating the SSS sequence is based on the symbol timing.

Cell identifier determiner 1345 may determine a physical cell identity of the base station based on the SSS sequence (e.g., based on a cell identifier group associated with the SSS) and the PSS sequence (e.g., based on a cell identifier associated with the PSS).

Subframe timing determiner 1350 may determine subframe timing based on the SSS sequence, synchronize the UE with the base station based on the SSS sequence and the physical cell identity, and determine a subframe offset for a reference signal based on the SSS sequence. In some cases, synchronizing the UE with the base station includes determining a subframe timing of the base station based on the SSS sequence.

Cost determiner 1355 may compute a cost for the timing hypothesis based on the auto-correlation values, where synchronizing the UE with the base station is based on a comparison of the computed cost to a threshold. Cost determiner 1355 may compute a second cost for a second timing hypothesis based on a second set of auto-correlation values, where synchronizing the UE with the base station is further based on a comparison of the second computed cost to the threshold.

Frequency estimator 1360 may determine a frequency estimate for the timing hypothesis based on the computed cost.

Mapper 1365 may map the SSS sequence to a first index of a set of indices and map the SSS sequence to the first index includes mapping a root and cyclic shift of the SSS sequence to the first index.

Offset determiner 1370 may determine a subframe offset for a reference signal based on the SSS sequence.

Scrambling rule determiner 1375 may determine a scrambling rule for the reference signal based on the subframe offset and descramble the reference signal based on the scrambling rule.

Decoder 1380 may decode a channel based on the reference signal.

Descrambler 1385 may determine a scrambling rule for the reference signal based on the subframe offset and descramble the reference signal based on the scrambling rule.

Figure 14:
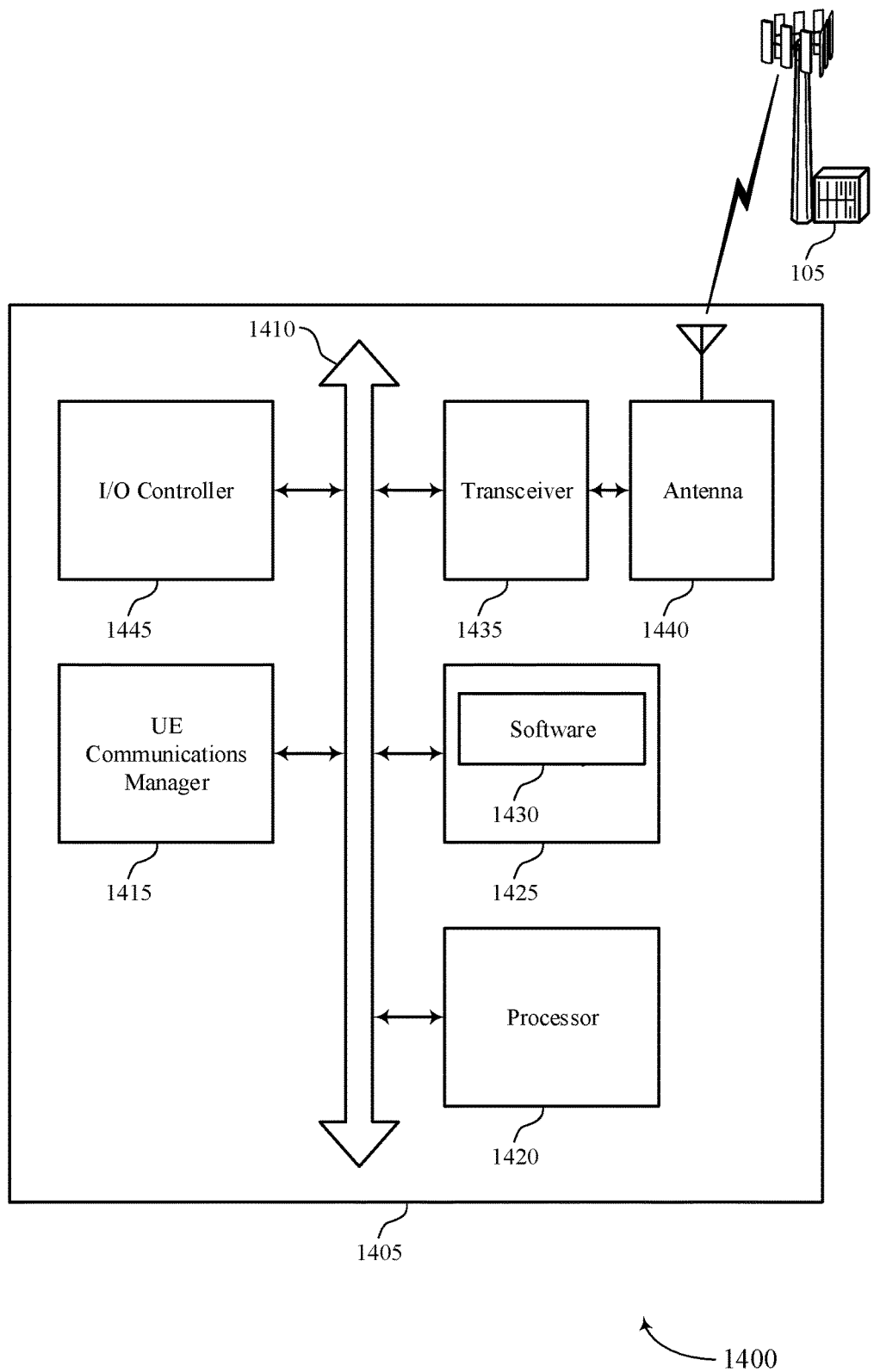
FIG. 14 illustrates a block diagram of a system including a UE that supports synchronization for wideband coverage enhancement in accordance with aspects of the present disclosure.

FIG. 14 shows a diagram of a system 1400 including a device 1405 that supports synchronization for wideband coverage enhancement in accordance with aspects of the present disclosure. Device 1405 may be an example of or include the components of wireless device 1105, wireless device 1205, or a UE 115 as described above, e.g., with reference to FIGS. 11 and 12. Device 1405 may include components for bi-directional voice and data communications including components for transmitting and receiving communications, including UE communications manager 1415, processor 1420, memory 1425, software 1430, transceiver 1435, antenna 1440, and I/O controller 1445. These components may be in electronic communication via one or more buses (e.g., bus 1410). Device 1405 may communicate wirelessly with one or more base stations 105.

Processor 1420 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1420 may be configured to operate a memory array using a memory controller. In other cases, a memory controller may be integrated into processor 1420. Processor 1420 may be configured to execute computer-readable instructions stored in a memory to perform various functions (e.g., functions or tasks supporting synchronization for wideband coverage enhancement).

Memory 1425 may include random access memory (RAM) and read only memory (ROM). The memory 1425 may store computer-readable, computer-executable software 1430 including instructions that, when executed, cause the processor to perform various functions described herein. In some cases, the memory 1425 may contain, among other things, a basic input/output system (BIOS) which may control basic hardware or software operation such as the interaction with peripheral components or devices.

Software 1430 may include code to implement aspects of the present disclosure, including code to support synchronization for wideband coverage enhancement. Software 1430 may be stored in a non-transitory computer-readable medium such as system memory or other memory. In some cases, the software 1430 may not be directly executable by the processor but may cause a computer (e.g., when compiled and executed) to perform functions described herein.

Transceiver 1435 may communicate bi-directionally, via one or more antennas, wired, or wireless links as described above. For example, the transceiver 1435 may represent a wireless transceiver and may communicate bi-directionally with another wireless transceiver. The transceiver 1435 may also include a modem to modulate the packets and provide the modulated packets to the antennas for transmission, and to demodulate packets received from the antennas.

In some cases, the wireless device may include a single antenna 1440. However, in some cases the device may have more than one antenna 1440, which may be capable of concurrently transmitting or receiving multiple wireless transmissions.

I/O controller 1445 may manage input and output signals for device 1405. I/O controller 1445 may also manage peripherals not integrated into device 1405. In some cases, I/O controller 1445 may represent a physical connection or port to an external peripheral. In some cases, I/O controller 1445 may utilize an operating system such as iOS®, ANDROID®, MS-DOS®, MS-WINDOWS®, OS/2®, UNIX®, LINUX®, or another known operating system. In other cases, I/O controller 1445 may represent or interact with a modem, a keyboard, a mouse, a touchscreen, or a similar device. In some cases, I/O controller 1445 may be implemented as part of a processor. In some cases, a user may interact with device 1405 via I/O controller 1445 or via hardware components controlled by I/O controller 1445.

Figure 15:
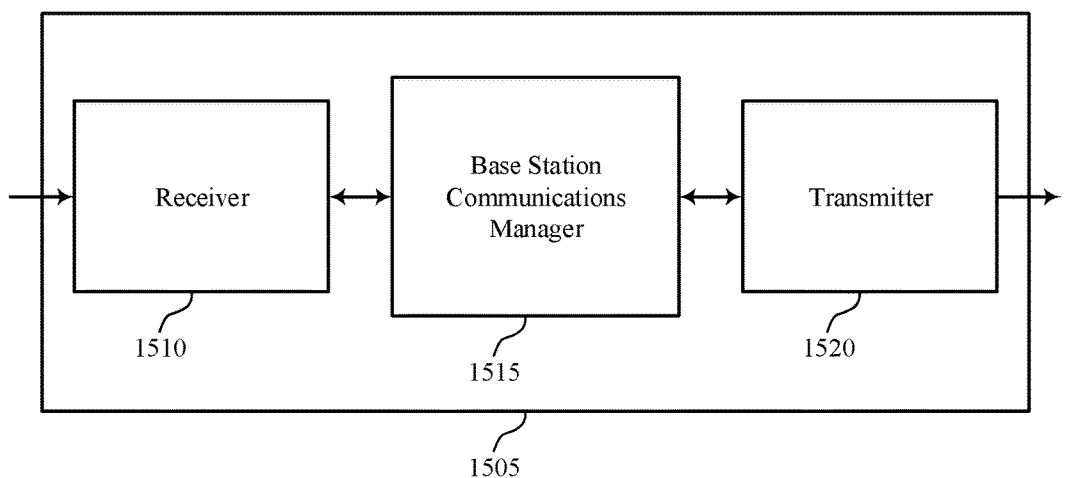
FIGS. 15 through 17 show block diagrams of a device that supports synchronization for wideband coverage enhancement in accordance with aspects of the present disclosure.

FIG. 15 shows a block diagram 1500 of a wireless device 1505 that supports synchronization for wideband coverage enhancement in accordance with aspects of the present disclosure. Wireless device 1505 may be an example of aspects of a base station 105 as described herein. Wireless device 1505 may include receiver 1510, base station communications manager 1515, and transmitter 1520. Wireless device 1505 may also include a processor. Each of these components may be in communication with one another (e.g., via one or more buses).

Receiver 1510 may receive information such as packets, user data, or control information associated with various information channels (e.g., control channels, data channels, and information related to synchronization for wideband coverage enhancement, etc.). Information may be passed on to other components of the device. The receiver 1510 may be an example of aspects of the transceiver 1835 described with reference to FIG. 18. The receiver 1510 may utilize a single antenna or a set of antennas.

Base station communications manager 1515 may be an example of aspects of the base station communications manager 1815 described with reference to FIG. 18.

Base station communications manager 1515 and/or at least some of its various sub-components may be implemented in hardware, software executed by a processor, firmware, or any combination thereof. If implemented in software executed by a processor, the functions of the base station communications manager 1515 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station communications manager 1515 and/or at least some of its various sub-components may be physically located at various positions, including being distributed such that portions of functions are implemented at different physical locations by one or more physical devices. In some examples, base station communications manager 1515 and/or at least some of its various sub-components may be a separate and distinct component in accordance with various aspects of the present disclosure. In other examples, base station communications manager 1515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1515 may generate, by a shortened Reed Solomon (RS) encoder, a SSS sequence based on a cell identifier group of a base station and transmit the SSS sequence.

Transmitter 1520 may transmit signals generated by other components of the device. In some examples, the transmitter 1520 may be collocated with a receiver 1510 in a transceiver module. For example, the transmitter 1520 may be an example of aspects of the transceiver 1835 described with reference to FIG. 18. The transmitter 1520 may utilize a single antenna or a set of antennas.

Figure 16:
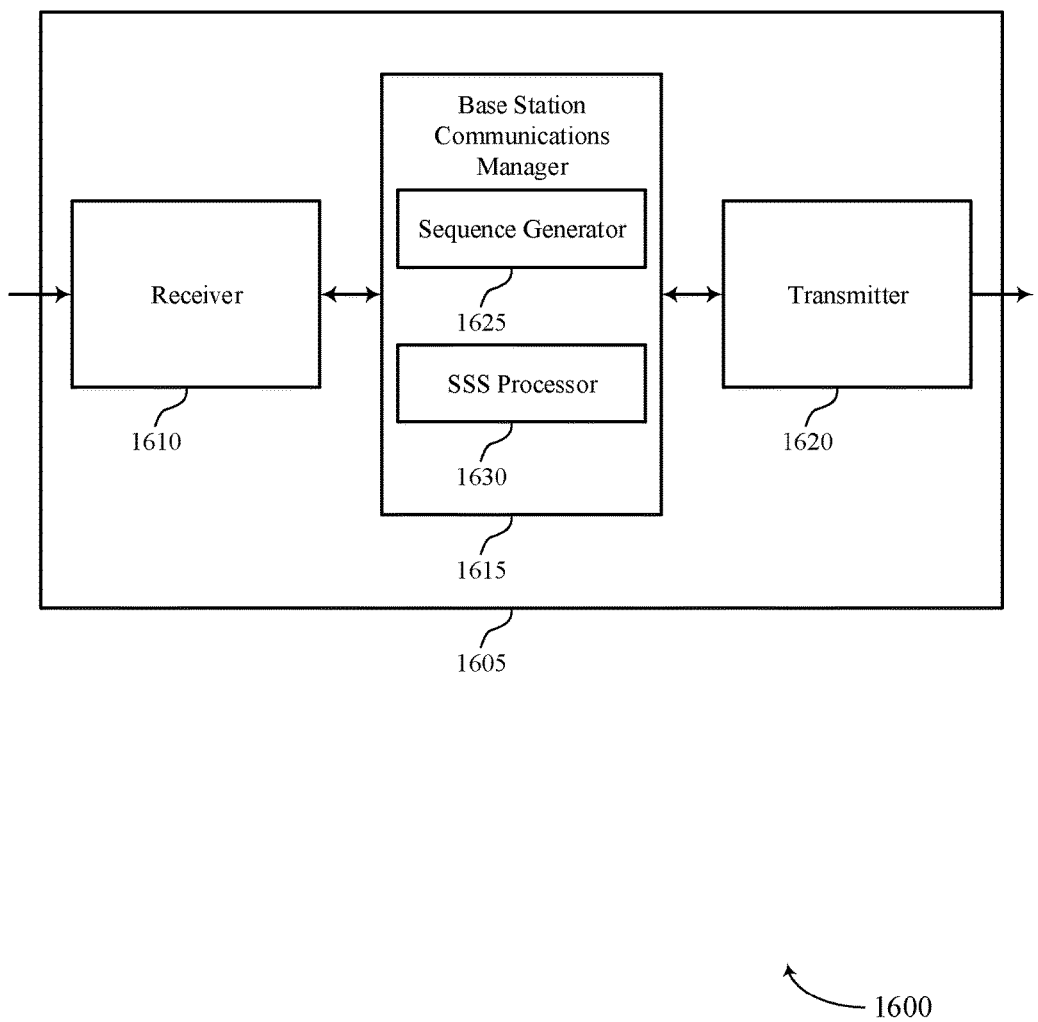

FIG. 16 shows a block diagram 1600 of a wireless device 1605 that supports synchronization for wideband coverage enhancement in accordance with aspects of the present disclosure. Wireless device 1605 may be an example of aspects of a wireless device 1505 or a base station 105 as described with reference to FIG. 15. Wireless device 1605 may include receiver 1610, base station communications manager 1615, and transmitter 1620. Wireless device 1605 may also include a processor. Each of these components may be in communication with one another (e.g., via one or more buses).

Receiver 1610 may receive information such as packets, user data, or control information associated with various information channels (e.g., control channels, data channels, and information related to synchronization for wideband coverage enhancement, etc.). Information may be passed on to other components of the device. The receiver 1610 may be an example of aspects of the transceiver 1835 described with reference to FIG. 18. The receiver 1610 may utilize a single antenna or a set of antennas.

Base station communications manager 1615 may be an example of aspects of the base station communications manager 1815 described with reference to FIG. 18.

Base station communications manager 1615 may also include sequence generator 1625 and SSS processor 1630.

Sequence generator 1625 may generate, by a shortened Reed Solomon (RS) encoder, a SSS sequence based on a cell identifier group of a base station and generate the SSS sequence is further based on a subframe offset of a reference signal within a frame. In some cases, the SSS sequence is a Zadoff-Chu sequence having a defined root and a defined cyclic shift.

SSS processor 1630 may transmit the SSS sequence.

Transmitter 1620 may transmit signals generated by other components of the device. In some examples, the transmitter 1620 may be collocated with a receiver 1610 in a transceiver module. For example, the transmitter 1620 may be an example of aspects of the transceiver 1835 described with reference to FIG. 18. The transmitter 1620 may utilize a single antenna or a set of antennas.

Figure 17:
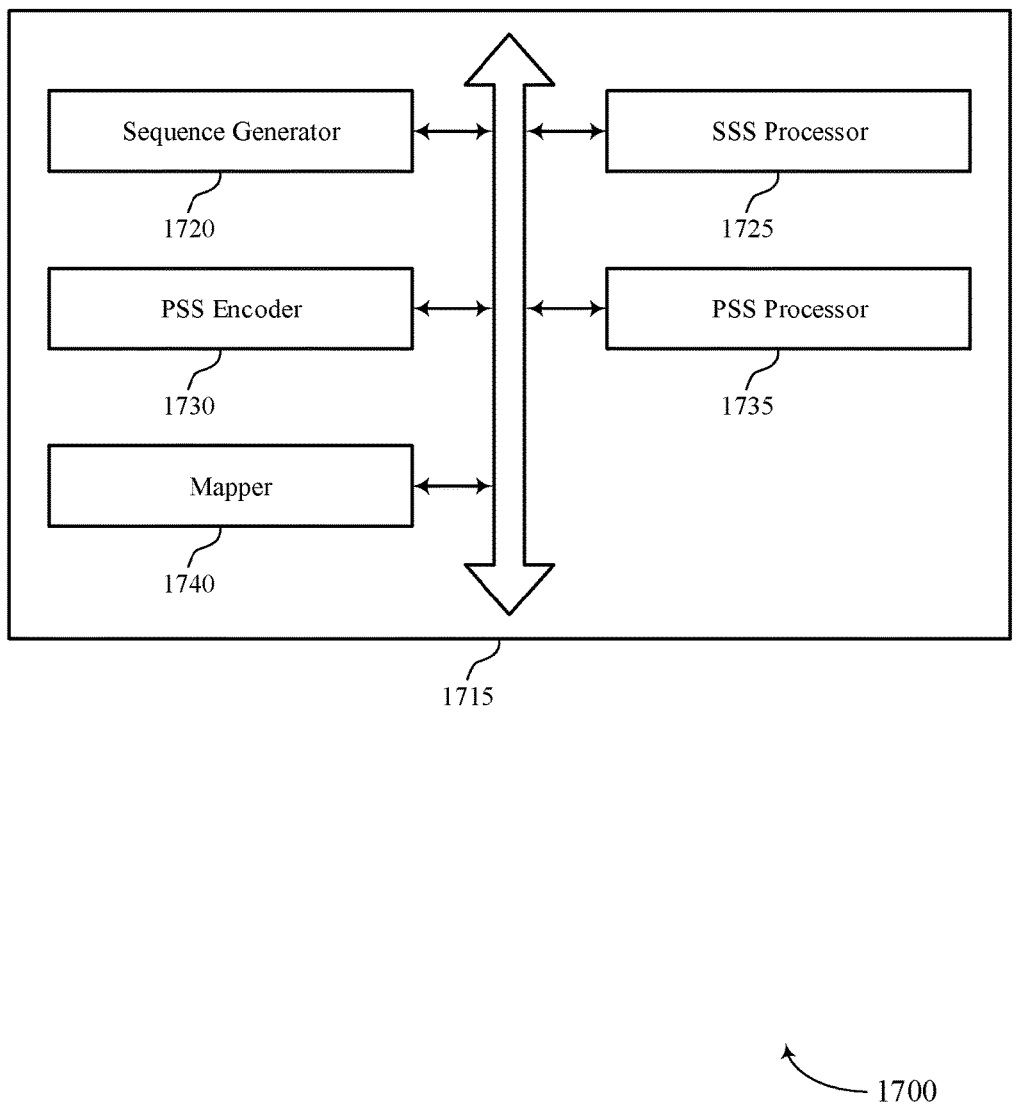

FIG. 17 shows a block diagram 1700 of a base station communications manager 1715 that supports synchronization for wideband coverage enhancement in accordance with aspects of the present disclosure. The base station communications manager 1715 may be an example of aspects of a base station communications manager 1815 described with reference to FIGS. 15, 16, and 18. The base station communications manager 1715 may include sequence generator 1720, SSS processor 1725, primary synchronization signal (PSS) encoder 1730, PSS processor 1735, and mapper 1740. Each of these modules may communicate, directly or indirectly, with one another (e.g., via one or more buses).

Sequence generator 1720 may generate, by a shortened Reed Solomon (RS) encoder, a SSS sequence based on a cell identifier group of a base station and generate the SSS sequence is further based on a subframe offset of a reference signal within a frame. In some cases, the SSS sequence is a Zadoff-Chu sequence having a defined root and a defined cyclic shift.

SSS processor 1725 may transmit the SSS sequence.

PSS encoder 1730 may encode a PSS sequence with a cover code to generate an encoded PSS sequence.

PSS processor 1735 may transmit the encoded PSS sequence a defined number of times within a subframe of a frame.

Mapper 1740 may store a table mapping a Galois Field alphabet to a set of Zadoff-Chu sequences each having a defined root and a defined cyclic shift.

Figure 18:
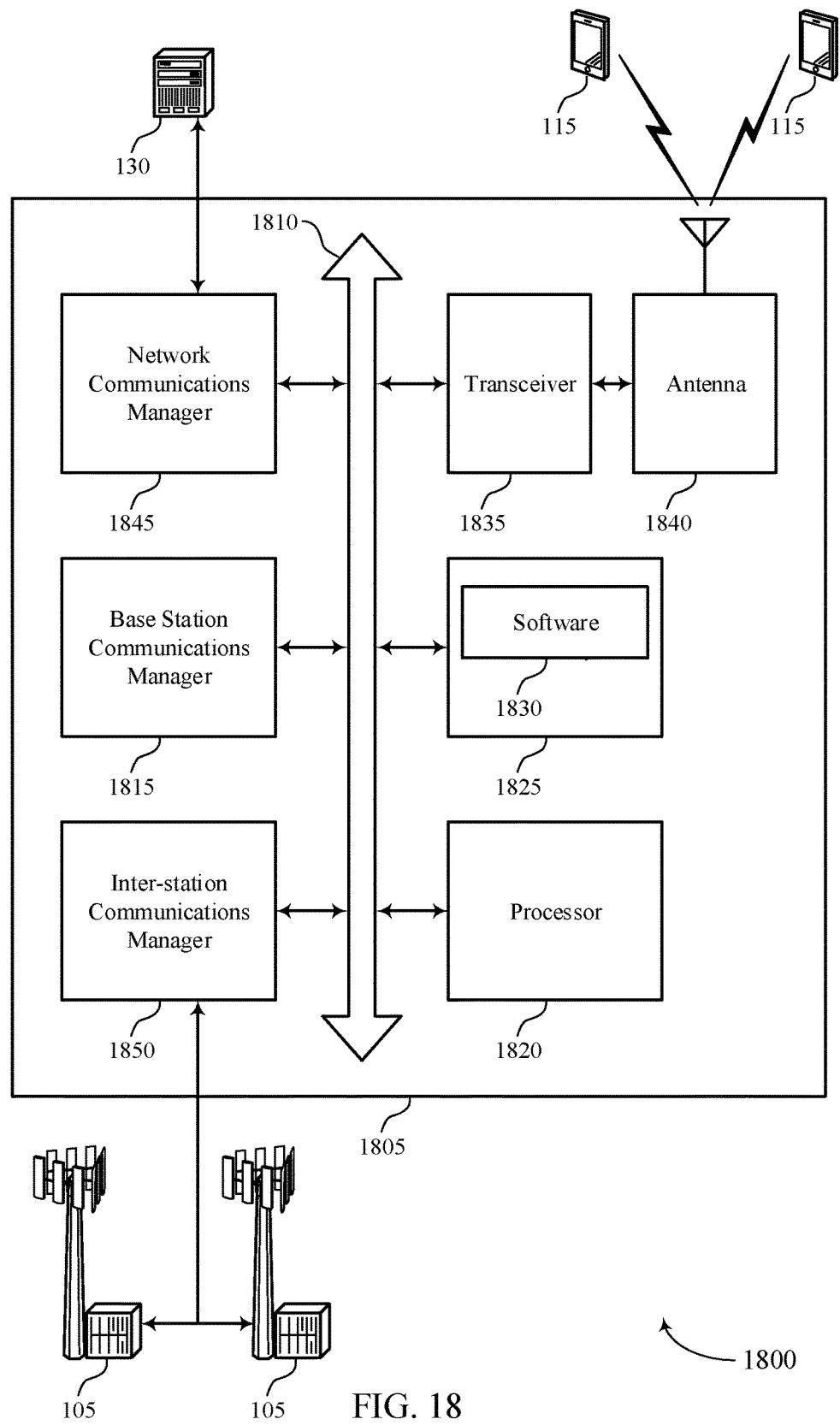
FIG. 18 illustrates a block diagram of a system including a base station that supports synchronization for wideband coverage enhancement in accordance with aspects of the present disclosure.

FIG. 18 shows a diagram of a system 1800 including a device 1805 that supports synchronization for wideband coverage enhancement in accordance with aspects of the present disclosure. Device 1805 may be an example of or include the components of base station 105 as described above, e.g., with reference to FIG. 1. Device 1805 may include components for bi-directional voice and data communications including components for transmitting and receiving communications, including base station communications manager 1815, processor 1820, memory 1825, software 1830, transceiver 1835, antenna 1840, network communications manager 1845, and inter-station communications manager 1850. These components may be in electronic communication via one or more buses (e.g., bus 1810). Device 1805 may communicate wirelessly with one or more UEs 115.

Processor 1820 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1820 may be configured to operate a memory array using a memory controller. In other cases, a memory controller may be integrated into processor 1820. Processor 1820 may be configured to execute computer-readable instructions stored in a memory to perform various functions (e.g., functions or tasks supporting synchronization for wideband coverage enhancement).

Memory 1825 may include RAM and ROM. The memory 1825 may store computer-readable, computer-executable software 1830 including instructions that, when executed, cause the processor to perform various functions described herein. In some cases, the memory 1825 may contain, among other things, a BIOS which may control basic hardware or software operation such as the interaction with peripheral components or devices.

Software 1830 may include code to implement aspects of the present disclosure, including code to support synchronization for wideband coverage enhancement. Software 1830 may be stored in a non-transitory computer-readable medium such as system memory or other memory. In some cases, the software 1830 may not be directly executable by the processor but may cause a computer (e.g., when compiled and executed) to perform functions described herein.

Transceiver 1835 may communicate bi-directionally, via one or more antennas, wired, or wireless links as described above. For example, the transceiver 1835 may represent a wireless transceiver and may communicate bi-directionally with another wireless transceiver. The transceiver 1835 may also include a modem to modulate the packets and provide the modulated packets to the antennas for transmission, and to demodulate packets received from the antennas.

In some cases, the wireless device may include a single antenna 1840. However, in some cases the device may have more than one antenna 1840, which may be capable of concurrently transmitting or receiving multiple wireless transmissions.

Network communications manager 1845 may manage communications with the core network (e.g., via one or more wired backhaul links). For example, the network communications manager 1845 may manage the transfer of data communications for client devices, such as one or more UEs 115.

Inter-station communications manager 1850 may manage communications with other base station 105, and may include a controller or scheduler for controlling communications with UEs 115 in cooperation with other base stations 105. For example, the inter-station communications manager 1850 may coordinate scheduling for transmissions to UEs 115 for various interference mitigation techniques such as beamforming or joint transmission. In some examples, inter-station communications manager 1850 may provide an X2 interface within a Long Term Evolution (LTE)/LTE-A wireless communication network technology to provide communication between base stations 105.

Figure 19:
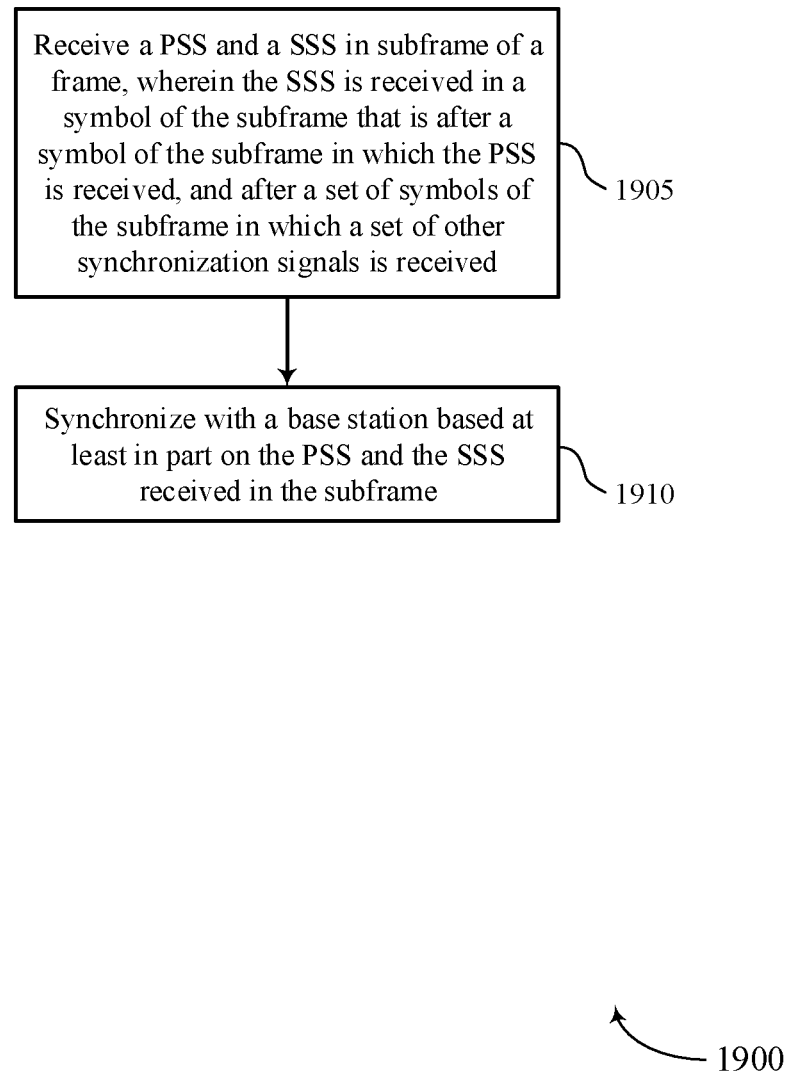
FIGS. 19 through 22 illustrate methods for synchronization for wideband coverage enhancement in accordance with aspects of the present disclosure.

FIG. 19 shows a flowchart illustrating a method 1900 for synchronization for wideband coverage enhancement in accordance with aspects of the present disclosure. The operations of method 1900 may be implemented by a UE 115 or its components as described herein. For example, the operations of method 1900 may be performed by a UE communications manager as described with reference to FIGS. 11 through 14. In some examples, a UE 115 may execute a set of codes to control the functional elements of the device to perform the functions described below. Additionally or alternatively, the UE 115 may perform aspects of the functions described below using special-purpose hardware.

At block 1905 the UE 115 may receive a PSS and a SSS in subframe of a frame, wherein the SSS is received in a symbol of the subframe that is after a symbol of the subframe in which the PSS is received, and after a set of symbols of the subframe in which a set of other synchronization signals is received. The operations of block 1905 may be performed according to the methods described herein. In certain examples, aspects of the operations of block 1905 may be performed by a signal processor as described with reference to FIGS. 11 through 14.

At block 1910 the UE 115 may synchronize with base station 105 based at least in part on the PSS and the SSS received in the subframe. The operations of block 1910 may be performed according to the methods described herein. In certain examples, aspects of the operations of block 1910 may be performed by a symbol generator as described with reference to FIGS. 11 through 14.

Figure 20:
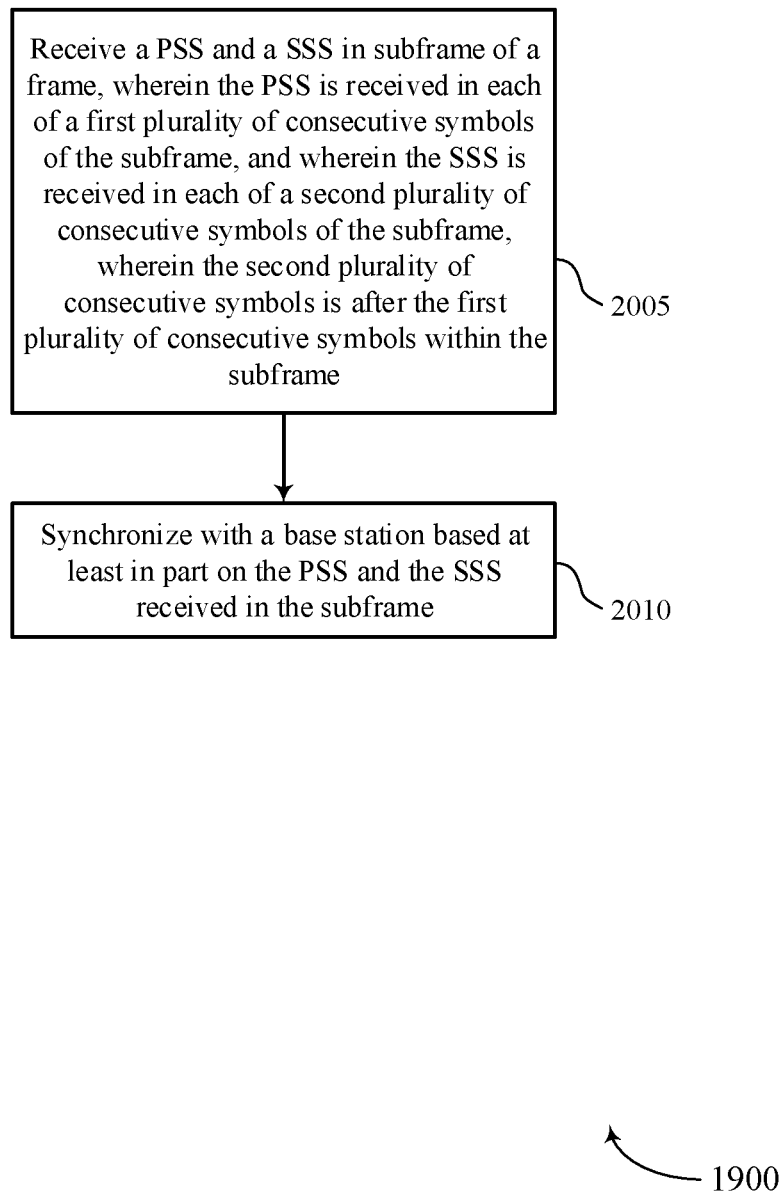

FIG. 20 shows a flowchart illustrating a method 2000 for synchronization for wideband coverage enhancement in accordance with aspects of the present disclosure. The operations of method 2000 may be implemented by a UE 115 or its components as described herein. For example, the operations of method 2000 may be performed by a UE communications manager as described with reference to FIGS. 11 through 14. In some examples, a UE 115 may execute a set of codes to control the functional elements of the device to perform the functions described below. Additionally or alternatively, the UE 115 may perform aspects of the functions described below using special-purpose hardware.

At block 2005 the UE 115 may receive a PSS and a SSS in subframe of a frame, wherein the PSS is received in each of a first plurality of consecutive symbols of the subframe, and wherein the SSS is received in each of a second plurality of consecutive symbols of the subframe, wherein the second plurality of consecutive symbols is after the first plurality of consecutive symbols within the subframe. The operations of block 2005 may be performed according to the methods described herein. In certain examples, aspects of the operations of block 2005 may be performed by a signal processor as described with reference to FIGS. 11 through 14.

At block 2010 the UE 115 may synchronize with base station 105 based at least in part on the PSS and the SSS received in the subframe. The operations of block 2010 may be performed according to the methods described herein. In certain examples, aspects of the operations of block 2010 may be performed by a symbol generator as described with reference to FIGS. 11 through 14.

Figure 21:
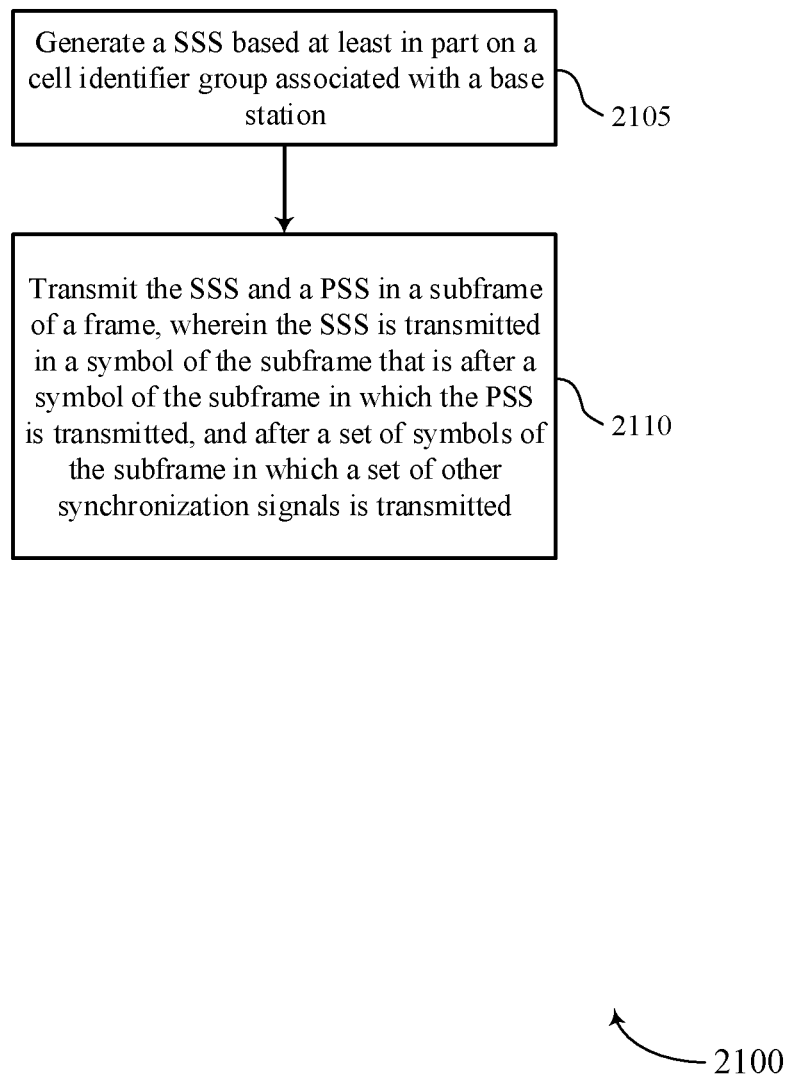

FIG. 21 shows a flowchart illustrating a method 2100 for synchronization for wideband coverage enhancement in accordance with aspects of the present disclosure. The operations of method 2100 may be implemented by a base station 105 or its components as described herein. For example, the operations of method 2100 may be performed by a base station communications manager as described with reference to FIGS. 15 through 18. In some examples, a base station 105 may execute a set of codes to control the functional elements of the device to perform the functions described below. Additionally or alternatively, the base station 105 may perform aspects of the functions described below using special-purpose hardware.

At block 2105 the base station 105 may generate a SSS based at least in part on a cell identifier group associated with the base station. The operations of block 2105 may be performed according to the methods described herein. In certain examples, aspects of the operations of block 2105 may be performed by a sequence generator as described with reference to FIGS. 15 through 18.

At block 2110 the base station 105 may transmit the SSS and a PSS in a subframe of a frame, wherein the SSS is transmitted in a symbol of the subframe that is after a symbol of the subframe in which the PSS is transmitted, and after a set of symbols of the subframe in which a set of other synchronization signals is transmitted. The operations of block 2110 may be performed according to the methods described herein. In certain examples, aspects of the operations of block 2110 may be performed by a SSS processor as described with reference to FIGS. 15 through 18.

Figure 22:
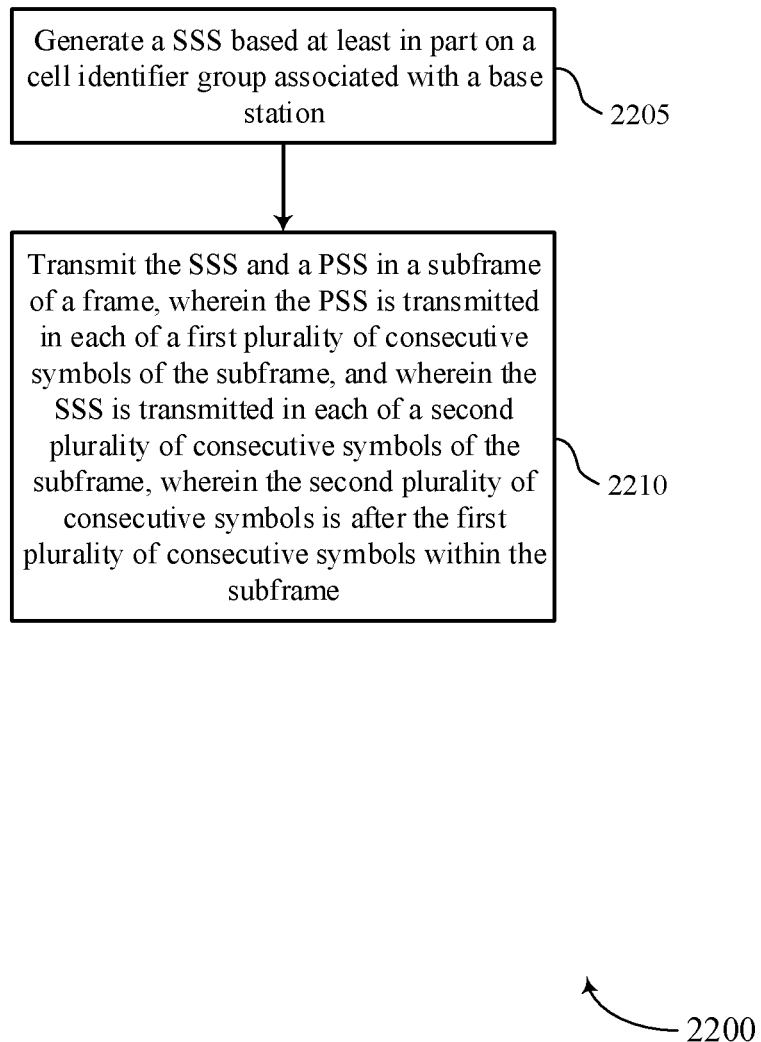

FIG. 22 shows a flowchart illustrating a method 2200 for synchronization for wideband coverage enhancement in accordance with aspects of the present disclosure. The operations of method 2200 may be implemented by a base station 105 or its components as described herein. For example, the operations of method 2200 may be performed by a base station communications manager as described with reference to FIGS. 15 through 18. In some examples, a base station 105 may execute a set of codes to control the functional elements of the device to perform the functions described below. Additionally or alternatively, the base station 105 may perform aspects of the functions described below using special-purpose hardware.

At block 2205 the base station 105 may generate a SSS based at least in part on a cell identifier group associated with the base station. The operations of block 2205 may be performed according to the methods described herein. In certain examples, aspects of the operations of block 2205 may be performed by a sequence generator as described with reference to FIGS. 15 through 18.

At block 2210 the base station 105 may transmit the SSS and a PSS in a subframe of a frame, wherein the PSS is transmitted in each of a first plurality of consecutive symbols of the subframe, and wherein the SSS is transmitted in each of a second plurality of consecutive symbols of the subframe, wherein the second plurality of consecutive symbols is after the first plurality of consecutive symbols within the subframe. The operations of block 2210 may be performed according to the methods described herein. In certain examples, aspects of the operations of block 2210 may be performed by a SSS processor as described with reference to FIGS. 15 through 18.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and/or the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and/or the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and/or the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   receiving, by a user equipment (UE), a primary synchronization signal (PSS) and a secondary synchronization signal (SSS) in a first subframe of a frame,
      wherein, in the first subframe, the SSS is received in a symbol of the first subframe that is after a symbol of the first subframe in which the PSS is received, and after a set of symbols of the first subframe in which a set of other synchronization signals is received, and
      wherein, in a second subframe of the frame, the SSS is received in a symbol of the second subframe that is before a symbol of the second subframe in which the PSS is received; and
   synchronizing, by the UE, with a base station based at least in part on the PSS and the SSS received in the first subframe.

2. The method of claim 1, further comprising:
   receiving the PSS and the SSS in the second subframe of the frame,
      wherein the SSS is received in flail the symbol of the second subframe that is further before a set of symbols of the second subframe in which the set of other synchronization signals is received,
      wherein the second subframe is before the first subframe, and
      wherein the apparatus is configured to synchronize with the base station based at least in part on the PSS or the SSS received in the second subframe.

3. The method of claim 2, wherein:
   within the first subframe:
      the symbols in which the PSS and the SSS are received are at a first particular location, and
      the set of symbols in which the set of other synchronization signals is received is at a second particular location; and
   within the second subframe:
      the set of symbols in which the set of other synchronization signals is received is at the first particular location, and
      the symbols in which the PSS and the SSS are received are at the second particular location.

4. The method of claim 3, wherein:
   within the first subframe:
      another PSS, included in the set of other synchronization signals, is received in a symbol, at the second particular location, that is before a symbol in which another SSS, included in the set of other synchronization signals, is received; and
   within the second subframe:
      the other PSS, included in the set of other synchronization signals, is received in a symbol, at the first particular location, that is after a symbol in which the other SSS, included in the set of other synchronization signals, is received.

5. The method of claim 1, further comprising:
   receiving the PSS and the SSS in a third subframe of the frame,
      wherein the SSS is received in a symbol of the third subframe that is after a symbol of the third subframe in which the PSS is received, and after a set of symbols of the third subframe in which the set of other synchronization signals is received,
      wherein the third subframe is after the first subframe, and
      wherein the apparatus is configured to synchronize with the base station based at least in part on the PSS or the SSS received in the third subframe.

6. A method for wireless communication, comprising:
   generating, by a base station, a secondary synchronization signal (SSS) based at least in part on a cell identifier group associated with the base station; and
   transmitting, by the base station, the SSS and a primary synchronization signal (PSS) in a first subframe of a frame,
      wherein, in the first subframe, the SSS is transmitted in a symbol of the first subframe that is after a symbol of the first subframe in which the PSS is transmitted, and after a set of symbols of the first subframe in which a set of other synchronization signals is transmitted, and
      wherein, in a second subframe of the frame, the SSS is transmitted in a symbol of the second subframe that is before a symbol of the second subframe in which the PSS is transmitted.

7. The method of claim 6, further comprising:
   transmitting the PSS and the SSS in the second subframe,
      wherein the SSS is transmitted in flail the symbol of the second subframe that is further before a set of symbols of the other subframe in which the set of other synchronization signals is transmitted,
      wherein the second subframe is before the first subframe, and
      wherein a user equipment is configured to synchronize with the base station based at least in part on the PSS or the SSS transmitted in the second subframe.

8. The method of claim 7, wherein:
within the first subframe:
the symbols in which the PSS and the SSS are transmitted are at a first particular location, and
the set of symbols in which the set of other synchronization signals is transmitted is at a second particular location; and
within the second subframe:
the set of symbols in which the set of other synchronization signals is transmitted is at the first particular location, and
the symbols in which the PSS the SSS are transmitted are at the second particular location.

9. The method of claim 8, wherein:
within the first subframe:
another PSS, included in the set of other synchronization signals, is transmitted in a symbol, at the second particular location, that is before a symbol in which another SSS, included in the set of other synchronization signals, is transmitted; and
within the second subframe:
the other PSS, included in the set of other synchronization signals, is transmitted in a symbol, at the first particular location, that is after a symbol in which the other SSS, included in the set of other synchronization signals, is transmitted.

10. The method of claim 6, further comprising:
transmitting the PSS and the SSS in a third subframe of the frame,
wherein the SSS is transmitted in a symbol of the third subframe that is after a symbol of the third subframe in which the PSS is transmitted, and after a set of symbols of the third subframe in which the set of other synchronization signals is transmitted,
wherein the third subframe is after the first subframe, and
wherein a user equipment is configured to synchronize with the base station based at least in part on the PSS or the SSS transmitted in the third subframe.

11. An apparatus for wireless communication, comprising:
a processor;
memory in electronic communication with the processor; and
instructions stored in the memory and operable, when executed by the processor, to cause the apparatus to:
receive a primary synchronization signal (PSS) and a secondary synchronization signal (SSS) in a first subframe of a frame,
wherein, in the first subframe, the SSS is received in a symbol of the first subframe that is after a symbol of the first subframe in which the PSS is received, and after a set of symbols of the first subframe in which a set of other synchronization signals is received, and
wherein, in a second subframe of the frame, the SSS is received in a symbol of the second subframe that is before a symbol of the second subframe in which the PSS is received; and
synchronize the apparatus with a base station based at least in part on the PSS and the SSS received in the first subframe.

12. The apparatus of claim 11, wherein the instructions are further executable by the processor to:
receive the PSS and the SSS in the second subframe of the frame,
wherein the SSS is received in flail the symbol of the second subframe that is further before a set of symbols of the second subframe in which the set of other synchronization signals is received,
wherein the second subframe is before the first subframe, and
wherein the apparatus is configured to synchronize with the base station based at least in part on the PSS or the SSS received in the second subframe.

13. The apparatus of claim 12, wherein:
within the first subframe:
the symbols in which the PSS and the SSS are received are at a first particular location, and
the set of symbols in which the set of other synchronization signals is received is at a second particular location; and
within the second subframe:
the set of symbols in which the set of other synchronization signals is received is at the first particular location, and
the symbols in which the PSS and the SSS are received are at the second particular location.

14. The apparatus of claim 13, wherein:
within the first subframe:
another PSS, included in the set of other synchronization signals, is received in a symbol, at the second particular location, that is before a symbol in which another SSS, included in the set of other synchronization signals, is received; and
within the second subframe:
the other PSS, included in the set of other synchronization signals, is received in a symbol, at the first particular location, that is after a symbol in which the other SSS, included in the set of other synchronization signals, is received.

15. The apparatus of claim 11, wherein the instructions are further executable by the processor to:
receive the PSS and the SSS in a third subframe of the frame,
wherein the SSS is received in a symbol of the third subframe that is after a symbol of the third subframe in which the PSS is received, and after a set of symbols of the third subframe in which the set of other synchronization signals is received,
wherein the third subframe is after the first subframe, and
wherein the apparatus is configured to synchronize with the base station based at least in part on the PSS or the SSS received in the third subframe.

16. An apparatus for wireless communication, comprising:
a processor;
memory in electronic communication with the processor; and
instructions stored in the memory and operable, when executed by the processor, to cause the apparatus to:
generate a secondary synchronization signal (SSS) based at least in part on a cell identifier group associated with a base station; and
transmit the SSS and a primary synchronization signal (PSS) in a first subframe of a frame,
wherein, in the first subframe, the SSS is transmitted in a symbol of the first subframe that is after a symbol of the first subframe in which the PSS is transmitted, and after a set of symbols of the first subframe in which a set of other synchronization signals is transmitted, and wherein, in a second subframe of the frame, the SSS is transmitted in a symbol of the second subframe that is before a symbol of the second subframe in which the PSS is transmitted.

17. The apparatus of claim 16, wherein the instructions are further executable by the processor to:
transmit the PSS and the SSS in the second subframe,
wherein the SSS is transmitted in flail the symbol of the second subframe that is further before a set of symbols of the other subframe in which the set of other synchronization signals is transmitted,
wherein the second subframe is before the first subframe, and
wherein the apparatus is configured to synchronize with a base station based at least in part on the PSS or the SSS transmitted in the second subframe.

18. The apparatus of claim 17, wherein:
within the first subframe:
the symbols in which the PSS and the SSS are transmitted are at a first particular location, and
the set of symbols in which the set of other synchronization signals is transmitted is at a second particular location; and
within the second subframe:
the set of symbols in which the set of other synchronization signals is transmitted is at the first particular location, and
the symbols in which the PSS the SSS are transmitted are at the second particular location.

19. The apparatus of claim 18, wherein:
within the first subframe:
another PSS, included in the set of other synchronization signals, is transmitted in a symbol, at the second particular location, that is before a symbol in which another SSS, included in the set of other synchronization signals, is transmitted; and
within the second subframe:
the other PSS, included in the set of other synchronization signals, is transmitted in a symbol, at the first particular location, that is after a symbol in which the other SSS, included in the set of other synchronization signals, is transmitted.

20. The apparatus of claim 16, wherein the instructions are further executable by the processor to:
transmit the PSS and the SSS in a third subframe of the frame,
wherein the SSS is transmitted in a symbol of the third subframe that is after a symbol of the third subframe in which the PSS is transmitted, and after a set of symbols of the third subframe in which the set of other synchronization signals is transmitted,
wherein the third subframe is after the first subframe, and
wherein the apparatus is configured to synchronize with the base station based at least in part on the PSS or the SSS transmitted in the third subframe.

21. A non-transitory computer readable medium storing code for wireless communication, the code comprising instructions executable by a processor to:
receive a primary synchronization signal (PSS) and a secondary synchronization signal (SSS) in a first subframe of a frame,
wherein, in the first subframe, the SSS is received in a symbol of the first subframe that is after a symbol of the first subframe in which the PSS is received, and after a set of symbols of the first subframe in which a set of other synchronization signals is received, and wherein, in a second subframe of the frame, the SSS is received in a symbol of the second subframe that is before a symbol of the second subframe in which the PSS is received; and
synchronize a user equipment with a base station based at least in part on the PSS and the SSS received in the first subframe.

22. The non-transitory computer readable medium of claim 21, wherein the instructions are further executable by the processor to:
receive the PSS and the SSS in the second subframe,
wherein the SSS is received in the symbol of the second subframe that is further before a set of symbols of the second subframe in which the set of other synchronization signals is received,
wherein the second subframe is before the first subframe, and
wherein the user equipment is configured to synchronize with the base station based at least in part on the PSS or the SSS received in the second subframe.

23. The non-transitory computer readable medium of claim 22, wherein:
within the first subframe:
the symbols in which the PSS and the SSS are received are at a first particular location, and
the set of symbols in which the set of other synchronization signals is received is at a second particular location; and
within the second subframe:
the set of symbols in which the set of other synchronization signals is received is at the first particular location, and
the symbols in which the PSS and the SSS are received are at the second particular location.

24. The non-transitory computer readable medium of claim 23, wherein:
within the first subframe:
another PSS, included in the set of other synchronization signals, is received in a symbol, at the second particular location, that is before a symbol in which another SSS, included in the set of other synchronization signals, is received; and
within the second subframe:
the other PSS, included in the set of other synchronization signals, is received in a symbol, at the first particular location, that is after a symbol in which the other SSS, included in the set of other synchronization signals, is received.

25. The non-transitory computer readable medium of claim 21, wherein the instructions are further executable by the processor to:
receive the PSS and the SSS in a third subframe of the frame,
wherein the SSS is received in a symbol of the third subframe that is after a symbol of the third subframe in which the PSS is received, and after a set of symbols of the third subframe in which the set of other synchronization signals is received,
wherein the third subframe is after the first subframe, and
wherein the user equipment is configured to synchronize with the base station based at least in part on the PSS or the SSS received in the third subframe.

26. A non-transitory computer readable medium storing code for wireless communication, the code comprising instructions executable by a processor to:

generate a secondary synchronization signal (SSS) based at least in part on a cell identifier group associated with a base station; and transmit the SSS and a primary synchronization signal (PSS) in a first subframe of a frame, wherein, in the first subframe, the SSS is transmitted in a symbol of the first subframe that is after a symbol of the first subframe in which the PSS is transmitted, and after a set of symbols of the first subframe in which a set of other synchronization signals is transmitted, and wherein, in a second subframe of the frame, the SSS is transmitted in a symbol of the second subframe that is before a symbol of the second subframe in which the PSS is transmitted.

27. The non-transitory computer readable medium of claim 26, wherein the instructions are further executable by the processor to:

transmit the PSS and the SSS in the second subframe, wherein the SSS is transmitted in flail the symbol of the second subframe that is further before a set of symbols of the other subframe in which the set of other synchronization signals is transmitted, wherein the second subframe is before the first subframe, and wherein a user equipment is configured to synchronize with the base station based at least in part on the PSS or the SSS transmitted in the second subframe.

28. The non-transitory computer readable medium of claim 27, wherein:

within the first subframe:

the symbols in which the PSS and the SSS are transmitted are at a first particular location, and the set of symbols in which the set of other synchronization signals is transmitted is at a second particular location; and within the second subframe:

the set of symbols in which the set of other synchronization signals is transmitted is at the first particular location, and the symbols in which the PSS the SSS are transmitted are at the second particular location.

29. The non-transitory computer readable medium of claim 28, wherein:

within the first subframe:

another PSS, included in the set of other synchronization signals, is transmitted in a symbol, at the second particular location, that is before a symbol in which another SSS, included in the set of other synchronization signals, is transmitted; and within the second subframe:

the other PSS, included in the set of other synchronization signals, is transmitted in a symbol, at the first particular location, that is after a symbol in which the other SSS, included in the set of other synchronization signals, is transmitted.

30. The non-transitory computer readable medium of claim 26, wherein the instructions are further executable by the processor to:

transmit the PSS and the SSS in a third subframe of the frame, wherein the SSS is transmitted in a symbol of the third subframe that is after a symbol of the third subframe in which the PSS is transmitted, and after a set of symbols of the third subframe in which the set of other synchronization signals is transmitted, wherein the third subframe is after the first subframe, and wherein a user equipment is configured to synchronize with the base station based at least in part on the PSS or the SSS transmitted in the third subframe.

* * * * *